US011904248B2

(12) United States Patent
Walker et al.

(10) Patent No.: US 11,904,248 B2
(45) **Date of Patent: *Feb. 20, 2024**

(54) CUSTOMIZABLE DISPLAY OF BETTING LAYOUT

(71) Applicant: IGT, Las Vegas, NV (US)

(72) Inventors: Jay S. Walker, Ridgefield, CT (US); Russell P. Sammon, San Francisco, CA (US); Stephen C. Tulley, Fairfield, CT (US); Daniel E. Tedesco, Huntington, CT (US); Robert C. Tedesco, Fairfield, CT (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/058,927

(22) Filed: Nov. 28, 2022

(65) Prior Publication Data

US 2023/0092722 A1 Mar. 23, 2023

Related U.S. Application Data

(63) Continuation of application No. 17/382,712, filed on Jul. 22, 2021, now Pat. No. 11,529,556, which is a continuation of application No. 16/580,578, filed on Sep. 24, 2019, now Pat. No. 11,090,553, which is a continuation of application No. 13/925,322, filed on Jun. 24, 2013, now Pat. No. 10,427,030, which is a continuation of application No. 11/816,298, filed as application No. PCT/US2006/037005 on Sep. 22, 2006, now Pat. No. 8,474,820.

(51) Int. Cl.
*A63F 5/00* (2006.01)
*G07F 17/32* (2006.01)

(52) U.S. Cl.
CPC ................ *A63F 5/00* (2013.01); *G07F 17/32* (2013.01)

(58) Field of Classification Search
CPC ........................................................ A63F 5/00
See application file for complete search history.

(56) References Cited

U.S. PATENT DOCUMENTS 4,357,659 A 11/1982 Nathans
5,588,650 A 12/1996 Eman et al.
(Continued)

FOREIGN PATENT DOCUMENTS

WO 9515543 A1 6/1995

OTHER PUBLICATIONS

"International Search Report", Application No. PCT/US2007/024801 (2 pages), dated Jul. 22, 2008.
(Continued)

*Primary Examiner* — William M Pierce
(74) *Attorney, Agent, or Firm* — Neal, Gerber & Eisenberg LLP

(57) ABSTRACT

A roulette table allows players to make customized betting selections and customize the layout of the betting options that appear on the player station of the roulette table. In particularly contemplated embodiments, players may add, delete, or modify the appearance of betting options through a user interface so that the players may more readily indicate desired wagers. This functionality may not only speed up game play, but also make the betting layout more intuitive for each user resulting in increased attendance of roulette games.

6 Claims, 17 Drawing Sheets

(56) References Cited

U.S. PATENT DOCUMENTS

| | | | | |
|---|---|---|---|---|
| 5,743,798 | A | 4/1998 | Adams et al. | |
| 5,755,440 | A | 5/1998 | Sher | |
| 5,775,993 | A | 7/1998 | Fentz et al. | |
| 5,803,067 | A | 9/1998 | Ellenburg et al. | |
| 6,059,659 | A | 5/2000 | Busch et al. | |
| 6,068,552 | A | 5/2000 | Walker et al. | |
| 6,083,105 | A | 7/2000 | Ronin et al. | |
| 6,110,041 | A | 8/2000 | Walker et al. | |
| 6,293,866 | B1 | 9/2001 | Walker et al. | |
| 6,311,976 | B1 | 11/2001 | Yoseloff et al. | |
| 6,358,150 | B1 | 3/2002 | Mir et al. | |
| 6,443,841 | B1 | 9/2002 | Rossides | |
| 6,464,582 | B1 | 10/2002 | Baerlocher et al. | |
| 6,520,856 | B1 | 2/2003 | Walker et al. | |
| 6,568,680 | B1 | 5/2003 | Moody et al. | |
| 6,575,467 | B1 | 6/2003 | Kal | |
| 6,652,378 | B2 | 11/2003 | Cannon et al. | |
| 6,659,866 | B2 | 12/2003 | Frost et al. | |
| 6,769,986 | B2 * | 8/2004 | Vancura | G07F 17/32 463/20 |
| 6,832,957 | B2 | 12/2004 | Falconer | |
| 6,887,157 | B2 * | 5/2005 | LeMay | G07F 17/34 463/16 |
| 6,899,618 | B2 | 5/2005 | Colin et al. | |
| 6,902,481 | B2 * | 6/2005 | Breckner | G07F 17/32 463/30 |
| 6,921,072 | B2 | 7/2005 | Hughes-Watts | |
| 6,939,226 | B1 | 9/2005 | Joshi | |
| 6,940,488 | B1 * | 9/2005 | Siddiqui | G06F 3/03543 345/671 |
| 6,991,543 | B2 | 1/2006 | Joshi | |
| 7,281,978 | B2 | 10/2007 | Moshal | |
| 7,665,736 | B1 | 2/2010 | Ko | |
| 7,753,789 | B2 | 7/2010 | Walker et al. | |
| 7,785,188 | B2 | 8/2010 | Cannon | |
| 11,704,000 | B1 * | 7/2023 | McIvor | G06F 9/451 715/764 |
| 11,721,167 | B2 * | 8/2023 | Huang | G07F 17/3248 463/16 |
| 11,735,012 | B2 * | 8/2023 | Acres | G07F 17/3225 463/19 |
| 2001/0036853 | A1 | 11/2001 | Thomas | |
| 2002/0077712 | A1 | 6/2002 | Safaei et al. | |
| 2002/0142846 | A1 | 10/2002 | Paulsen | |
| 2002/0183105 | A1 | 12/2002 | Cannon et al. | |
| 2002/0193099 | A1 | 12/2002 | Paulsen | |
| 2004/0072604 | A1 | 4/2004 | Toyoda | |
| 2005/0026670 | A1 * | 2/2005 | Lardie | G07F 17/32 463/16 |
| 2005/0032563 | A1 | 2/2005 | Sines | |
| 2005/0071023 | A1 * | 3/2005 | Gilliland | G07F 17/3211 700/91 |
| 2005/0096121 | A1 * | 5/2005 | Gilliland | G07F 17/32 463/20 |
| 2005/0239536 | A1 | 10/2005 | Ogiwara | |
| 2006/0089195 | A1 | 4/2006 | Walker et al. | |
| 2006/0094493 | A1 | 5/2006 | Kido | |
| 2006/0170155 | A1 | 8/2006 | Silverman | |
| 2006/0178191 | A1 | 8/2006 | Ellis | |
| 2007/0135203 | A1 | 6/2007 | Nicely | |
| 2007/0135204 | A1 | 6/2007 | Nicely | |
| 2007/0203971 | A1 | 8/2007 | Walker et al. | |
| 2008/0051176 | A1 | 2/2008 | Okada | |
| 2008/0076548 | A1 | 3/2008 | Paulsen | |
| 2008/0125219 | A1 | 5/2008 | Williams et al. | |
| 2008/0136105 | A1 | 6/2008 | Toyoda | |
| 2008/0136106 | A1 | 6/2008 | Toyoda | |
| 2008/0139269 | A1 | 6/2008 | Toyoda | |
| 2009/0117994 | A1 | 5/2009 | Kelly et al. | |
| 2010/0148442 | A1 | 6/2010 | Walker et al. | |
| 2010/0210353 | A1 * | 8/2010 | Gagner | G07F 17/3209 463/25 |

OTHER PUBLICATIONS

"International Search Report", Application No. PCT/US06/37005 (3 pages), dated Jul. 8, 2008.

"Written Opinion", Application No. PCT/US2007/024801 (7 pages), dated Jul. 22, 2008.

"Written Opinion", Application No. PCT/US06/37005 (5 pages), dated Jul. 8, 2008.

* cited by examiner

310

| PLAYER IDENTIFIER 312 | NAME 314 | ADDRESS 316 | PLAYER SINCE 318 | TOTAL WAGERED 320 | HOTEL GUEST 322 | THEORETICAL WIN 324 | MOST FREQUENT ROULETTE BETS 326 | STORED ROULETTE BETS 328 |
|---|---|---|---|---|---|---|---|---|
| P-000001 | BOB JONES | 15 ELM ST. SPRINGTOWN, NY | 11/20/99 | $1,535.00 | YES | $138.15 | RED - $15 | RED - $15 |
| P-000002 | MARIA LOPEZ | 35 GUMDROP DR. CAPITAL CITY, CA | 7/28/04 | $168.50 | NO | $15.17 | HIGH - $5<br>7 - $15 | NO |
| ⋮ | | ⋮ | | ⋮ | | ⋮ | | ⋮ |
| P-106998 | CHARLES WILLIAMS | 140 MAIN ST. PRAIRIEVILLE, ND | 1/15/93 | $19,754.25 | NO | $1,777.88 | VOISONS - $45 | NO |
| P-106999 | KLYE SMITH | 65 BEACH LN. # 1 BEACH CITY, NJ | 3/26/98 | $980.10 | YES | $88.21 | FIRST 12 - $30<br>3, 8, 34 - $20<br>BLACK - $5 | MY FAVORITE (3, 8, 34 - $20) BLACK - $5 (RESIZED) |

FIG. 15

CUSTOMIZABLE DISPLAY OF BETTING LAYOUT

PRIORITY CLAIM

This application is a continuation of, and claims priority to and the benefit of, U.S. patent application Ser. No. 17/382,712, filed on Jul. 22, 2021, which is a continuation of, and claims priority to and the benefit of U.S. patent application Ser. No. 16/580,578, filed on Sep. 24, 2019, now U.S. Pat. No. 11,090,553, which issued on Aug. 17, 2021, which is a continuation of, and claims priority to and the benefit of, U.S. patent application Ser. No. 13/925,322, filed on Jun. 24, 2013, now U.S. Pat. No. 10,427,030, which issued on Oct. 1, 2019, which is a continuation of, and claims priority to and the benefit of, U.S. patent application Ser. No. 11/816,298, filed on Oct. 20, 2009, now U.S. Pat. No. 8,474,820, which issued on Jul. 2, 2013, which claims priority to and the benefit of PCT Application No. PCT/US06/37005, filed on Sep. 22, 2006, the entire contents of each of which are incorporated herein by reference.

FIELD OF THE INVENTION

The present disclosure is directed to a roulette gaming device and particularly to a display capable of providing customized betting layouts to players.

BRIEF DESCRIPTION OF THE SEVERAL VIEWS OF THE DRAWINGS

FIG. 15 illustrates an exemplary player-tracking database in accordance with at least one embodiment;

DETAILED DESCRIPTION OF THE INVENTION

Gambling remains a lucrative business for many establishments throughout the United States. Many games of chance are offered, but such establishments are generally looking for new games or improved versions of existing games so that the games are fresh and attract new customers while retaining old customers. Roulette is a game that is currently under appreciated in the United States with a corresponding lack of patrons. One potential barrier to player entry is the confusing array of potential wagers. While the array of potential wagers may be confusing, it also imposes a limit on betting options and is usually presented in a static format. Another potential barrier is the speed with which the player must place her myriad bets on the betting layout. Thus, there is a generalized need to improve the betting interface for roulette.

Some embodiments improve the betting interface for roulette by allowing players to customize an individual betting layout to include betting options the players are likely to use in the course of gambling at the roulette game. For example, if a player never makes column bets, the player may delete the column bet option from her individual betting layout. Likewise, if the player likes to wager on her child's birthday numbers: seven, twenty-one, twenty and double zero (corresponding to a birthday of Jul. 21, 2000) as a single bet, the player may create a customized betting option in her betting layout. Then, through a single act, the player may place a bet on each number. Odds may be calculated for the group of numbers as a composite or individually as practical or desired. Numerous variations on these possibilities exist as better explained herein.

Figure 1:
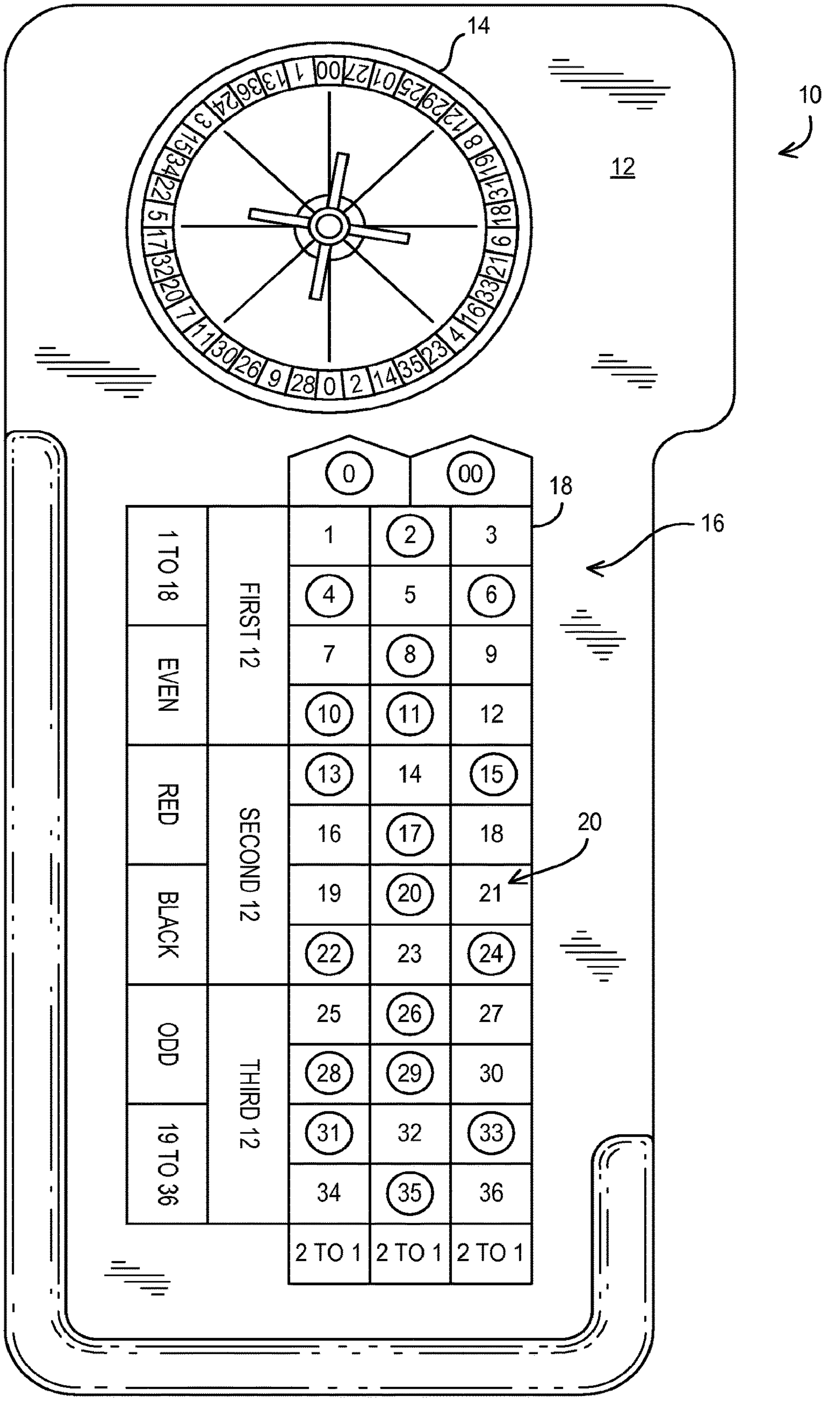
FIG 1 PRIOR ART
FIG. 1 illustrates a plan view of a conventional roulette table.
Figure 2:
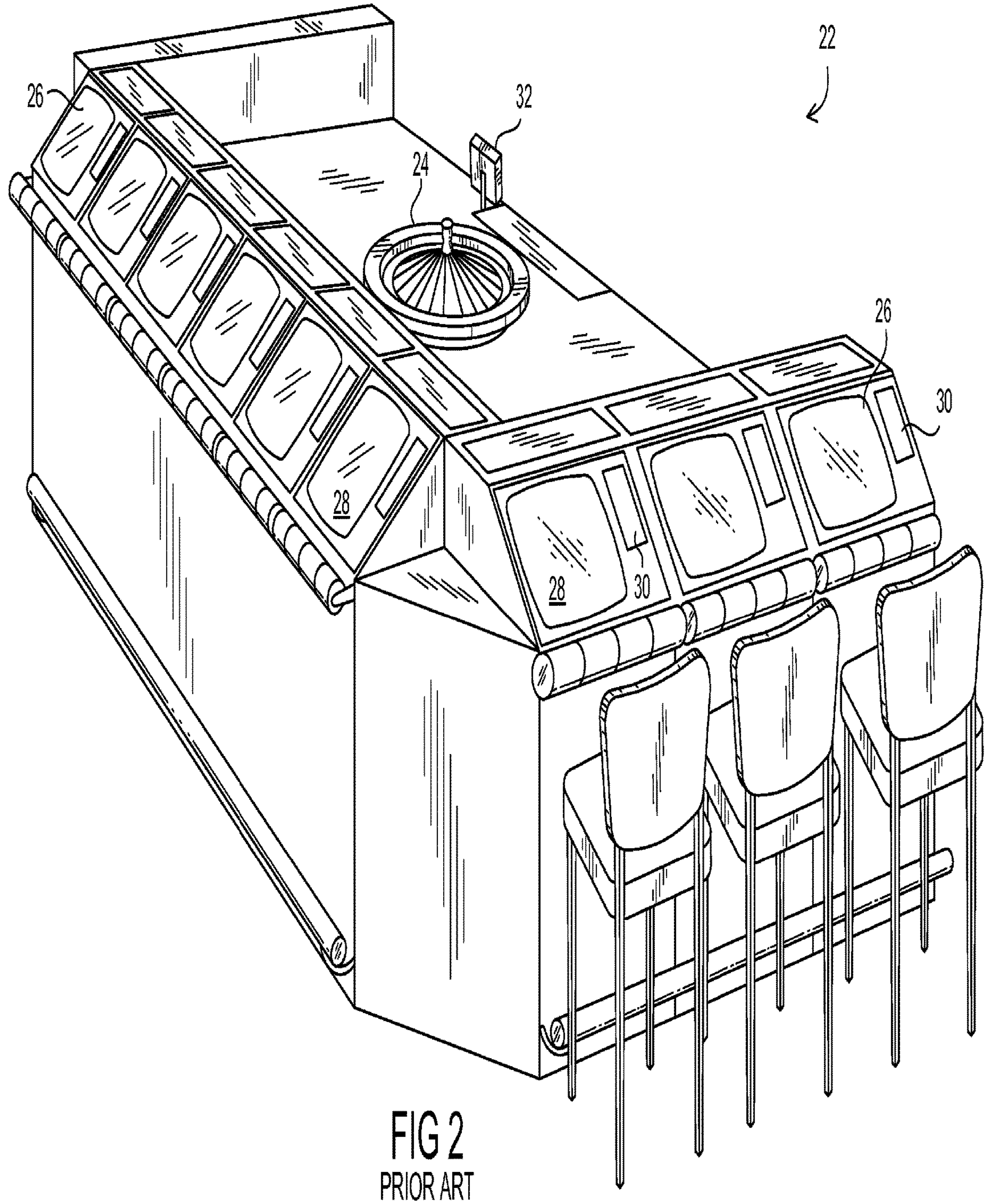
FIG 2 PRIOR ART
FIG. 2 illustrates a perspective view of a conventional roulette table with video terminal betting stations.
Figure 3:
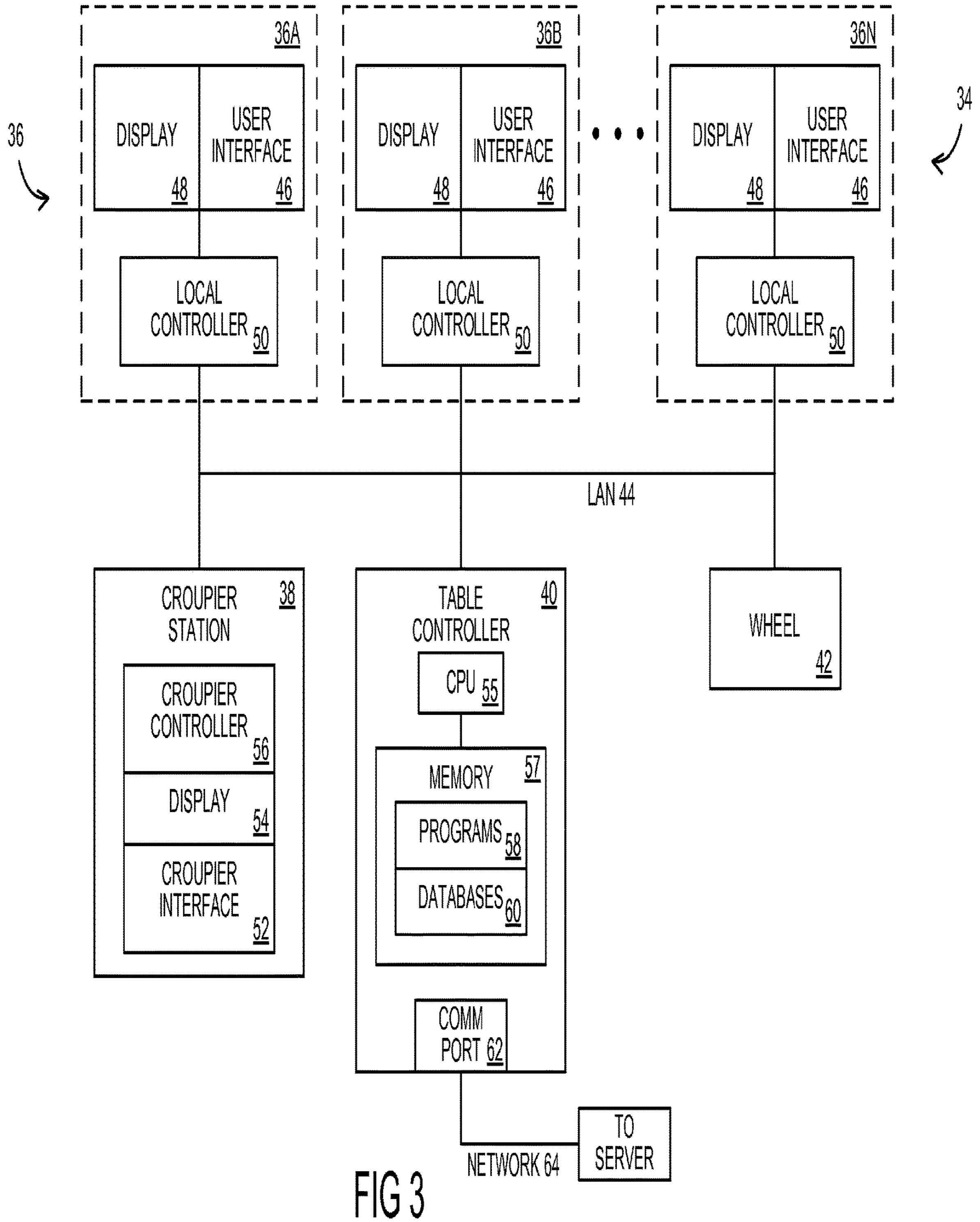
FIG. 3 illustrates a block diagram of a roulette system suitable for use with at least some embodiments of the present invention.

Two conventional roulette tables are presented with reference to FIGS. 1 and 2 along with an explanation of standard bets that may be made in conventional roulette games. Some embodiments of the present invention are discussed thereafter beginning with reference to FIG. 3.

FIG. 1 illustrates a plan view of a conventional roulette table 10. The roulette table 10 typically has a planar surface 12 on which a roulette wheel 14 is positioned in such a manner that the roulette wheel 14 may spin freely as is well understood. A betting field 16 is disposed opposite the roulette wheel 14 and includes indicia 18 that delimit individual bet options 20.

In practice, players purchase chips from the croupier and place bets by positioning their chips relative to the indicia 18 such that a bet option 20 is selected. The croupier spins the roulette wheel 14 and introduces a ball thereinto. The ball moves around the wheel 14 in a direction opposite the rotation of the wheel 14. Friction slows the ball until it falls into a labeled cup on the wheel 14 as is well understood. The croupier collects the chips from the losing wagers and dispenses chips for the winning wagers. The process then repeats. Some tables have a historical outcomes display that lists outcomes from previous spins. For example, outcomes for the last ten spins may be displayed. While each spin is independent of every other spin, some players may use this historical outcome listing to assist them in guessing which numbers are "due" or which numbers are "hot".

There are two generally recognized styles of roulette wheels 14, namely U.S. and European. The difference between the two styles is that the U.S. style roulette wheel includes the numbers zero through thirty-six and a double zero. In contrast, the European style roulette wheel includes just numbers zero through thirty-six. Roulette wheel 14, as illustrated, is a U.S. style roulette wheel and the present disclosure focuses on the U.S. style of a roulette wheel, but the teachings set forth herein are generally applicable to a European wheel. Note that the number placement differs between the U.S. style and the European style.

Conventional betting options presented on the table 10 include the numbers individually (a straight or straight up bet), even, odd, red, black, low (numbers one through eighteen), high (numbers nineteen through thirty-six), first twelve (numbers one through twelve), second twelve (numbers thirteen through twenty-four), third twelve (numbers twenty-five through thirty-six), first column (numbers one, four, seven, ten, thirteen, sixteen, nineteen, twenty-two, twenty-five, twenty-eight, thirty-one, and thirty-four), second column (numbers two, five, eight, eleven, fourteen, seventeen, twenty, twenty-three, twenty-six, twenty-nine, thirty-two, and thirty-five), and third column (numbers three, six, nine, twelve, fifteen, eighteen, twenty-one, twenty-four, twenty-seven, thirty, thirty-three, and thirty-six). Each of these bet options has explicit indicia 18 on the table 10.

There are other conventional wagers that do not have specific indicia, but whose import is known to roulette players. A split bet is a wager on two numbers that appear next to one another in the indicia 18. This wager is denoted by placing a chip on the line between the two bet options (e.g., the line between one and four or twenty-nine and thirty). A street bet (sometimes called a row bet) is a wager on three numbers on the same row. This wager is denoted by placing a chip outside the row of numbers on which the wager rides (e.g., to wager on one-two-three, the chip is placed on the line that is the outside edge of the three). A corner bet is a wager on four adjoining numbers as designated by the indicia 18. This wager is denoted by placing a chip at the four-way intersection of the four numbers (e.g., at the intersection of thirty-one, thirty-two, thirty-four, and thirty-five). A square bet is a wager on zero, one, two, or three and is denoted by placing the chip at the intersection of zero and three at the corner of a European style wheel. A five number bet is similar to the square bet, but adds the double zero. This wager is denoted by placing a chip at the intersection of zero and one, on the corner. A line bet is in essence wagering on two streets or rows. This wager is denoted by placing a chip on the outer intersection of the two rows in question (e.g., to bet on seven through twelve, a chip would be placed at the outer intersection of nine and twelve).

As a note of nomenclature, the roulette bets set forth above are sometimes divided into two categories called inside bets which include straight, split, street, corner, five, and line bets and outside bets which include red/black, odd/even, low/high, columns, and dozens.

French roulette (which uses the European style wheel 14) has a number of called bets that are honored by some gaming establishments. These bets are not typically designated by indicia 18, but may be explicitly set forth on certain tables. One called bet is the "voisins de zero" or "neighbors of zero" which covers the arc of numbers around the zero on the wheel. Note that since wheel 14 is a U.S. style wheel, the illustrated numbers do not match up with the recited numbers herein; however, on an actual European style wheel, this arc of numbers includes twenty-two, eighteen, twenty-nine, seven, twenty-eight, twelve, thirty-five, three, twenty-six, zero, thirty-two, fifteen, nineteen, four, twenty-one, two, and twenty-five. When selected, nine chips (or a multiple thereof) are placed, two each on the intersection of zero/two/three and twenty-five/twenty-six/twenty-eight/twenty-nine and one each on four/seven, twelve/fifteen, eighteen/twenty-one, nineteen/twenty-two, and thirty-two/thirty-five. A second called bet is the "Tier du Cylindre" and covers twelve numbers with six chips (or a multiple thereof), two numbers per chip. The numbers are twenty-seven, thirteen, thirty-six, eleven, thirty, eight, twenty-three, ten, five, twenty-four, sixteen, and thirty-three. A third called bet is the "Orphelins" or "Orphans" which is a bet on the bow-tied shaped middle section of the wheel not covered by the Voisins or Tier called bets. The numbers covered are seventeen, thirty-four, six, one, twenty, fourteen, thirty-one, and nine. When selected five chips are bet. These five chips will cover the number one with one chip and the numbers six/nine, fourteen/seven, seventeen/twenty, and thirty-one/thirty-four, each with one chip. A fourth called bet is a "number and neighbor" bet which bets on the number and two neighboring numbers on each side relative to the wheel 14. It takes five chips (or a multiple thereof) to cover this wager (one for each number in the bet). A fifth called bet is a "final bet". This wager covers all numbers with the same last number (e.g., four, fourteen, twenty-four, and thirty-four). It takes four chips (or a multiple thereof) to cover this wager. Typically, only numbers one through six are eligible for final bets because numbers seven-nine only have three instances on the wheel.

A summary of the conventional wagers and the odds are presented below in table 1.

TABLE 1

| Wager Name | Number of Numbers Covered | Odds |
|---|---|---|
| Straight Up Bet | 1 | 35:1 |
| Split Bet | 2 | 17:1 |
| Street (row) Bet | 3 | 11:1 |
| Corner Bet | 4 | 8:1 |
| Square Bet | 4 (0, 1, 2, 3) | 8:1 |
| Five Number Bet | 5 (0, 00, 1, 2, 3) | 6:1 |
| Line Bet | 6 | 5:1 |
| Dozens | 12 | 2:1 |
| Columns | 12 | 2:1 |
| Low/High | 18 | 1:1 |
| Odd/Even | 18 | 1:1 |
| Red/Black | 18 | 1:1 |
| Voisins de Zero | 17 | 0, 2, 3 11:1 |
| | | 25, 26, 28, 29 8:1 |
| | | 4, 7, 12, 15, 18 17:1 |
| | | 19, 21, 22, 32, 35 17:1 |
| Tier du Cylindre | 12 | 17:1 |
| Orphelins | 8 | 1 35:1 |
| | | 6, 7, 9, 14, 17 17:1 |
| | | 20, 31, 34 17:1 |
| Neighbor | 5 | 35:1 |
| Final | 4 | 8:1 |

As used herein, the wagers set forth in Table 1 are defined to be standard wagers. Conversely, as used herein, nonstandard wagers are those wagers, which are not standard wagers as that term is defined herein.

An interesting side effect of the nature of the table 10 is that roulette chips usually have no value denomination printed on the chip. Rather, the table 10 comes with sets of different colored chips, each usually consisting of three hundred chips of that color. When a player buys-in, the player gets her own color, and the value of an individual chip is determined by dividing the buy-in by the number of chips the player receives. For example, a player who buys one hundred chips for five hundred dollars gets one hundred chips each worth five dollars. The croupier typically places a token on top of the house stack of that color to indicate the value.

A necessary consequence of the chip scheme of a normal roulette table is that the number of players cannot exceed the number of different colors available at the table. For example, if there are only six colors, then only six players can play at that table. Electronic roulette tables which are not bound by a chips allow more players to play simultaneously.

A conventional electronic roulette table 22 is illustrated in FIG. 2. The electronic roulette table 22 includes a wheel 24, which may be European or U.S. style that spins freely. In place of the betting area 16, the electronic roulette table 22 includes a plurality of player terminals 26 which include a display 28 and a user interface 30. Each display 28 presents a video representation of a betting layout essentially identical to betting area 16 complete with indicia 18 and bet options 20. The display 28 may be a touch screen. Players create equity through the user interface 30, such as by inserting cash into a bill acceptor, using a cashless receipt system, or the like. Establishing equity may create a number of credits that the player may then use to place wagers. Wagers are then made by using the established equity (e.g., betting a certain number of credits) and touching the touch screen or other command functions of the user interface 30.

A croupier or other gaming establishment personnel may use a croupier screen 32 to track the wagers as they are made. For more information about an electronic roulette table 22, the interested reader is referred to U.S. Pat. No. 6,659,866 and U.S. Patent Publication No. 2006/0094493, both of which are incorporated herein by reference in their entireties.

While the conventional roulette tables 10 and 22 are adequate to present conventional roulette games, some players, especially those who place multiple nonstandard bets or those who have a disability limiting movement, may find it difficult to position the chips properly before the croupier announces, "No more bets". Various embodiments address these concerns and provide players the opportunity to customize their betting options so as to facilitate quick and easy wagering as well as provide other advantages as will be readily apparent to those reading the present disclosure. To this end, an exemplary embodiment modifies an electronic roulette table 34, presented in a block diagram format in FIG. 3.

Table 34 includes player stations 36A, 36B . . . 36N (generically player stations 36), a croupier station 38, a table controller 40, and a wheel 42 operatively coupled to one another through a network such as local area network (LAN) 44.

Each player station 36 includes a user interface 46, a display 48, and an optional local controller 50. The display 48 may be thought of as part of the user interface 46 as it provides visual output to the player. While not shown, the user interface 46 may include a keypad (e.g., alphanumeric, just numeric, QWERTY, or the like), a bill acceptor, a coin acceptor, a magnetic card reader (either for establishing equity or reading a player-tracking card), an RFID interrogator (again either for establishing equity or reading a player-tracking transponder), a coin hopper, a cashless receipt printer, a cashless receipt acceptor, speakers, a microphone, a mouse, joystick, touchpad, or the like. In some embodiments, various elements may be combined. For example, the bill acceptor and the cashless receipt acceptor may utilize the same aperture and sensor suite. Likewise, the display 48 may be a touchscreen display that doubles as a keypad, making the display 48 even more central to the user interface 46.

The optional local controller 50 may be a controller as that term is defined in the Rules of Interpretation section of this disclosure below, and provide the functionality of the player station 36. In some embodiments, the local controller 50 is a robust element that has extensive control over the player station 36. In other embodiments, the player station 36 is a thin client for the table controller 40 or other remote server, and the local controller 50 has necessary and sufficient processing capabilities and support software to effectuate this role. As explained in greater detail below, players use the player station 36 to establish equity and make wagers. Players may use the player station 36 to create customized bets and customize the betting layout according to some embodiments.

Note that while the player stations 36 are contemplated as being formed within the table 34, such are not required for every embodiment. Rather, the player stations 36 may be operatively coupled to the table 34 through any appropriate network means. For example, some player stations 36 may be embodied in mobile terminals such as cellular phones or personal digital assistants (PDAs) communicatively coupled to the table 34 and network 44 through a wireless interface or the like. More on such a mobile terminal embodiment is set forth below with reference to FIG. 6.

The croupier station 38 may include a croupier interface 52, a display 54, and an optional croupier controller 56. The display 54 may be thought of as part of the croupier interface 52 as it provides visual output for the croupier. The croupier interface 52 may include the same elements as described above for the user interface 46, although, in some embodiments, the bill acceptor and/or the cashless receipt acceptor may be eliminated. As with the display 48, the display 54 may be touchscreen display to consolidate some of the user interface functions. The optional croupier controller 56 may be a controller as that term is defined in the Rules of Interpretation below. As with the local controller 50, the croupier controller 56 may be a robust element with full control over the croupier station 38 or a thin client with the bulk of the processing being executed at a remote location.

Croupiers or other gaming establishment personnel may use the croupier station 38 to accept wagers, close wagering, award benefits including payouts and comp points, initiate the spinning of the wheel 42, track historical outcomes for the wheel 42, and other functions as practical or desired. In some embodiments, the croupier may customize a player's betting layout through the croupier station 38. Croupiers may also recommend bets based on observations of players or their bets. Such recommended bets may be made verbally to the player along with appropriate instructions on how to customize the player's betting layout on the player display 48 as will be explained in greater detail below. Alternatively, the croupier may make the suggestions through the croupier station 38 and send the suggestions to the player station 36 as a package that the player can accept or decline. Additionally, in some embodiments where the player has created a customized betting layout or a customized bet, croupiers may need to authorize the customization of the betting layout by players or approve customized betting options. Such approval may be provided through the croupier station 38.

The table controller 40 may be a controller as that term is defined in the Rules of Interpretation set forth below. Specifically, the controller may include a central processing unit (CPU) 55 and memory 57. Software programs 58 and databases 60 may be stored in memory 57. The CPU 55 may access programs 58 and databases 60 through any appropriate technique to facilitate operation of the functions described herein. The table controller 40 may act as a server for the client player stations 36 and croupier station 38. The table controller 40 may also be communicatively coupled through a communication port 62 and network 64 to a remote server (e.g., controller 108 described in greater detail below). In one embodiment, the table controller 40 may be merged with the croupier controller 50. In another embodiment, the table controller 40 may be accessed through the croupier interface 52, but remain a separate CPU 55 and memory 57. In still another embodiment, the table controller 40 may have its own user interface (not shown) so that personnel may interact with the table controller 40.

The wheel 42 may be a physical wheel such as wheel 14 or a virtual wheel. If the wheel 42 is a virtual wheel, it may be presented on a display in a central location so that players at the player stations 36 may view the movement of the wheel and the ball. Alternatively, the video representation of the wheel 42 may be sent over the network 44 to the displays 48 if practical or desired. In the event that the wheel 42 is an electronic or virtual wheel, a random number generator may be used. Such a random number generator may generate data representing random or pseudo-random values (referred to as "random numbers" herein). The random number generator may generate a random number every predetermined unit of time (e.g., every second) or in response to an initiation of a game. In the former embodiment, the generated random numbers may be used as they are generated (e.g., the random number generated at substantially the time of game initiation is used for that game) and/or stored for future use in the memory 57. Such a random number generator may be embodied as a processor separate from but working in cooperation with CPU 55. Alternatively, the random number generator may be embodied as an algorithm, program component, or software program 58 stored in the memory 57 or other device and used to generate a random number. Other methods of determining a random number may be employed. For example, a gaming device owner or operator may obtain sets of random numbers that have been generated by another entity. HotBits™, for example, is a service that provides random numbers that have been generated by timing successive pairs of radioactive decays detected by a Geiger-Muller tube interfaced to a computer.

The LAN 44 and the network 64 are networks as that term is defined in the Rules of Interpretation below.

The table 34 may include a display (not shown) that presents historical outcomes of the wheel 42. Such a display may be an CRT, LED, LCD, or the like. In place of a dedicated display, the historical outcomes may be made available to the players through display 48 either displayed continuously, displayed periodically (e.g., while bets are being accepted, but not once betting is closed or vice versa), selectively accessed through a command or menu, or the like as practical or desired.

While not illustrated, some or all of the elements set forth herein may be embodied as a peripheral device rather than integrated into the table 34. For example, the croupier station 38 or the historical outcome display may readily be embodied in such a peripheral device. Peripheral devices may also be well suited for retrofitting features to an existing electronic table 34.

In an alternate embodiment, the wheel 42 may allow for multiple balls to be utilized concurrently. Exemplary multi-ball roulette wheels are disclosed in U.S. Pat. Nos. 5,102,135; 5,755,440; 5,934,999; 6,497,409; 6,890,255, which are all hereby incorporated by reference in their entireties. Further multi-ball roulette wheels are disclosed in U.S. Patent Publications 2003/0094752; 2005/0261048; and 2006/0066044, which are all hereby incorporated by reference in their entireties. The interested reader is also referred to PCT publication WO 95/05877, which is hereby incorporated by reference in its entirety.

Figure 4:
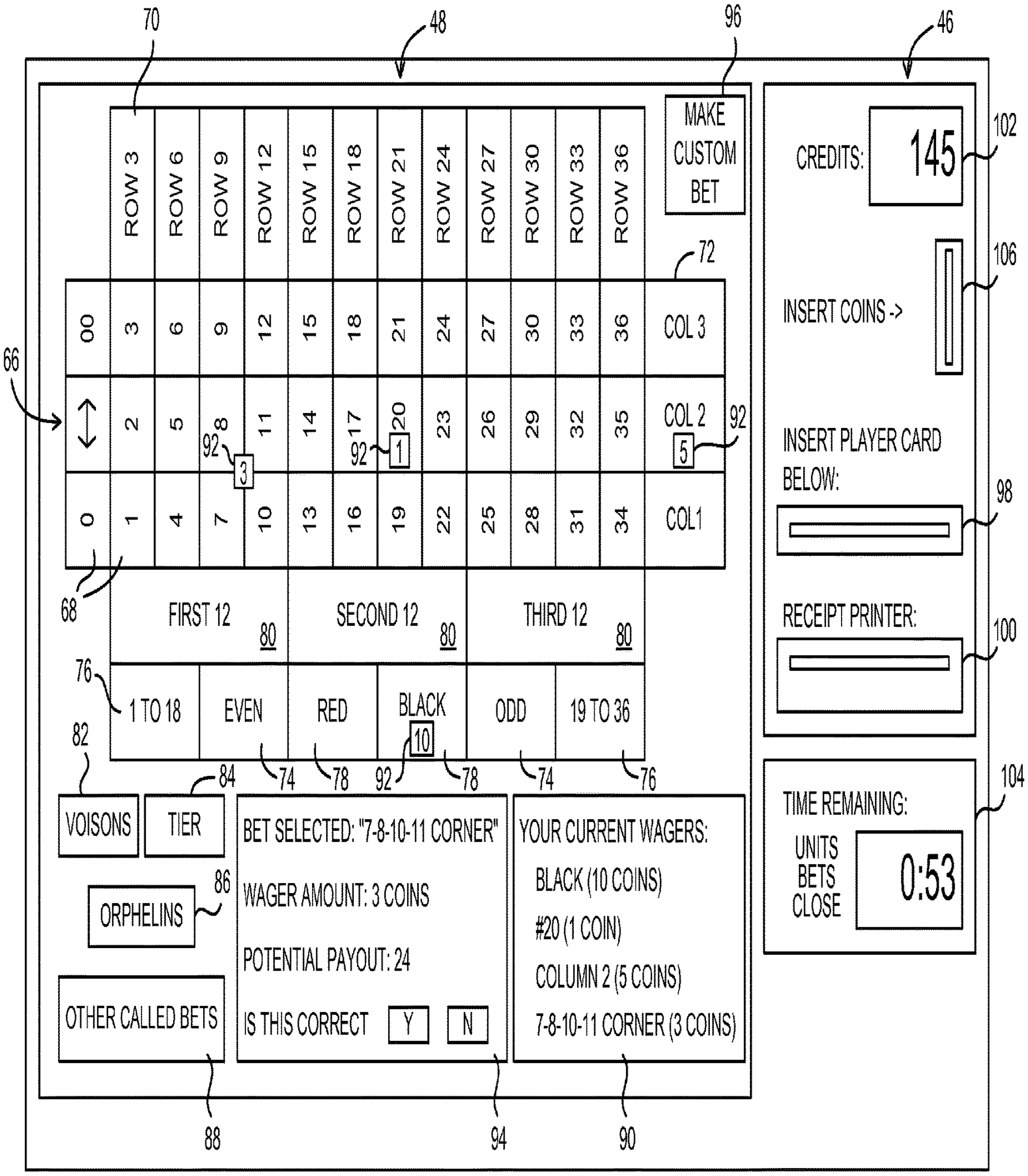
FIG. 4 illustrates an exemplary initial screen shot suitable for use on a roulette terminal display by at least some embodiments of the present invention.

Turning now to FIG. 4, an exemplary screen shot of a betting layout on a player display 48 coupled with a more detailed view of an exemplary user interface 46 is presented. In its most basic state (e.g., when a player first approaches the player station 36), the display 48 presents a standardized betting layout 66 that provides the player the option to place wagers based on standard bets. In particular, the betting layout 66 includes shortcut indicia through which the player may place wagers. Shortcut indicia, as that term is used herein, means a visual representation or indication of a potential wager, which when selected through a command or input, facilitates placing the potential wager. While the shortcut indicia may have a wager amount associated with it, in its broadest sense, the shortcut indicia need not have a wager amount associated with it.

If the display 48 is a touch screen, the player may touch a number button 68 to place a straight up bet, touch a row button 70 to place a row bet, touch a column button 72 to place a column bet, touch even/odd buttons 74 to place corresponding bets, touch low/high buttons 76 to place corresponding bets, touch red/black buttons 78 to place corresponding bets, touch twelve buttons 80 to place corresponding bets, touch voisons button 82 to make a voisons bet, touch tier button 84 to make a tier bet, touch orphelins button 86 to make an orphans bet, and touch an "other called bets" button 88 to switch screens to a second screen that lists the other called bets as corresponding touch buttons. Alternatively, all called bets may be on a separate screen that is accessed by a button (not shown). As still another option, all outside bets are accessed by a separate button, and only the inside bets are normally displayed. While not explicitly shown, it should be appreciated that the touch screen may include zones for split, street, line, corner, and other bets in addition to the buttons explicitly discussed above. Each bet option button falls within the definition of shortcut indicia.

In the exemplary screen shot, a wager summary field 90 provides a summary of the player's current wagers. Given the fluid nature of the coins used in roulette, a coin may sometimes be thought of herein as a unit of wager as that term is defined in the Rules of Interpretation. However, given that the player stations 36 are discrete and there is no need to rely on color to differentiate between chips of different players, the coins may look like the more traditionally denominated chips. In the illustrated example, the player has a ten coin wager on black, a one coin wager on the number twenty, a five coin wager on column two, and a three coin wager on the corner of seven-eight-ten-eleven. Appropriate numerical indicia 92 may also be used to show the wagers on the betting layout 66. To achieve multi-coin wagers, the player may tap the appropriate shortcut indicia a number of times equal to the number of coins wagered. Alternatively, the player taps the screen once, activating the shortcut indicia, and a menu with a list of a number of coins may be presented from which the player may select a denomination for the wager. A keypad may similarly be used to enter a wager through typing. As an alternative to the touch screen embodiment, a mouse or other user input device may move a curser around the display, and clicking the mouse button may activate a hyperlink or icon or expose a drop down menu or similar command sequence so as to provide entry of the desired wagers. Such menu items, icons, and hyperlinks may also be shortcut indicia.

In addition to the wager summary field, there may be a current wager entry field 94, which recites the last wager entered by the player, the amount and the potential payout. The current wager entry field 94 may further include a query to the player whether the wager is correct along with buttons for the player to accept the wager or cancel the wager. Thus, if the player means to strike the seven-eight-ten-eleven corner bet space, but misses the correct portion of the touch screen and instead touches the seven-ten split bet space, the player may tap the "no" button in the current wager entry field 94 and cancel the incorrect wager followed by a more precise entry of the desired wager. Similarly, if the player has selected an incorrect amount or wager from a menu, such a query may provide the player the opportunity to correct the mistake.

The display 48 may further include a "make custom bet" button 96, which allows the player to change the standard betting layout 66 as will be further described herein.

The user interface 46 may include a player-tracking card reader 98, a receipt printer 100, a credit or coin meter 102, a clock 104 that counts down the time until the betting is closed for a particular spin of the wheel 42, and a coin acceptor 106. Still other components may form the user interface 46, and the illustration of FIG. 4 is intended to be non-limiting.

Figure 5:
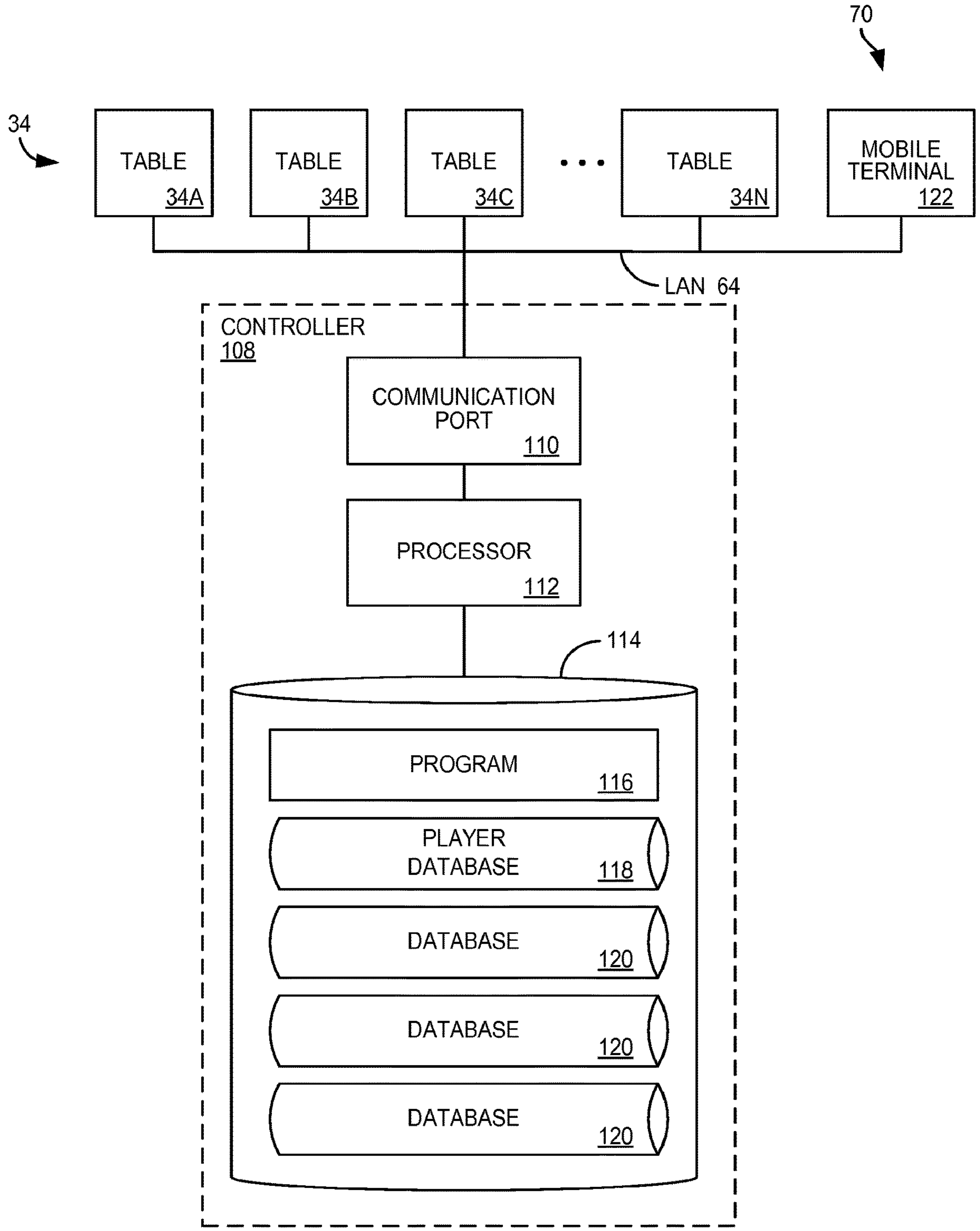
FIG. 5 illustrates a block diagram of a server based embodiment of a roulette system suitable for use with the present invention.

While the table 34 may be a stand-alone unit that acts autonomously, the table 34 may also be part of a larger network as illustrated in FIG. 5. In particular, a plurality of tables 34A-34N may be connected through the network 64 to a controller 108. The network 64 may be a LAN or other network as practical or desired. The controller 108 is a controller as defined in the Rules of Interpretation below and may include a communication port 110, a processor 112, and memory 114 with programs 116, a player database 118 and other databases 120 stored therein. In addition to the tables 34, the controller 108 may also communicate with a mobile terminal 122 as better explained with reference to FIG. 6 below.

The controller 108 may perform some of the functionality previously attributed to the table 34. That is, the controller 108 may act as a server and the tables 34 act as client devices. Alternatively, the controller 108 may be a server for the player stations 36, effectively omitting the need for a robust table controller 40. The precise division of labor between the various controllers forms the basis for a number of different embodiments.

The programs 116 facilitate operation of the controller 108 as set forth in the definition of a controller in the Rules of Interpretation. The programs 116 in particular may allow the controller 108 to track gambling, gaming or other activity performed at the tables 34, track gaming or other activities of individual players, instruct a table 34 to perform one or more functions (e.g., output a message to a player, interrupt play, or the like), assign or otherwise determine a unique identifier for a player, and/or control access to stored funds and/or a credit line. In some embodiments the controller 108 may be operable to configure a table 34 remotely, update software stored on a table 34, and/or download software or software components to a table 34. For example, the controller 108 may be operable to apply a hot fix or patch to software stored on a table 34 and/or transmit a new version of software and/or a software component to a table 34. The controller 108 may be programmed to perform any or all of the functions described herein based on, for example, an occurrence of an event (e.g., a scheduled event), receiving an indication from authorized gaming establishment personnel, an authorized third party (e.g., a regulator) and/or receiving a request from a player. It is particularly contemplated that the table 34 may be a thin client controlled by the controller 108, although such is not required for operation.

As an alternative to the controller 108 configuring the table 34, it is also possible that the controller 108 stores games thereon, and these games are requested from the table 34. For example, a table 34B could request to download a two-ball roulette game during certain time periods and then switch back to a single ball roulette game at other time periods. The table 34 may be programmed to check periodically if updates are available, and, if an update is available, download and install the update. Alternatively, the table 34 may check for updates on occurrence of an event, an indication from authorized gaming establishment personnel, an indication from an authorized third party, or the like.

In other embodiments, some or all of the functions ascribed to the controller 108 may be handled by a device distinct from the controller 108 such as a peripheral device.

The player database 118 may be embodied as a player-tracking database 310, which is described in greater detail below with reference to FIG. 15. The other databases 120 may include, but are not limited to: a game database that stores information regarding one or more games playable on and/or downloadable to one or tables 34 or other gaming devices, and a scheduling and/or configuration database useful for determining which games are to be made available on which tables or gaming devices at what times. Note that the player database 118 and the other databases 120 may be contained within a single device or distributed amongst a plurality of devices as practical or desired. The databases 118, 120 may also be duplicated between a plurality of devices as practical or desired.

Figure 6:
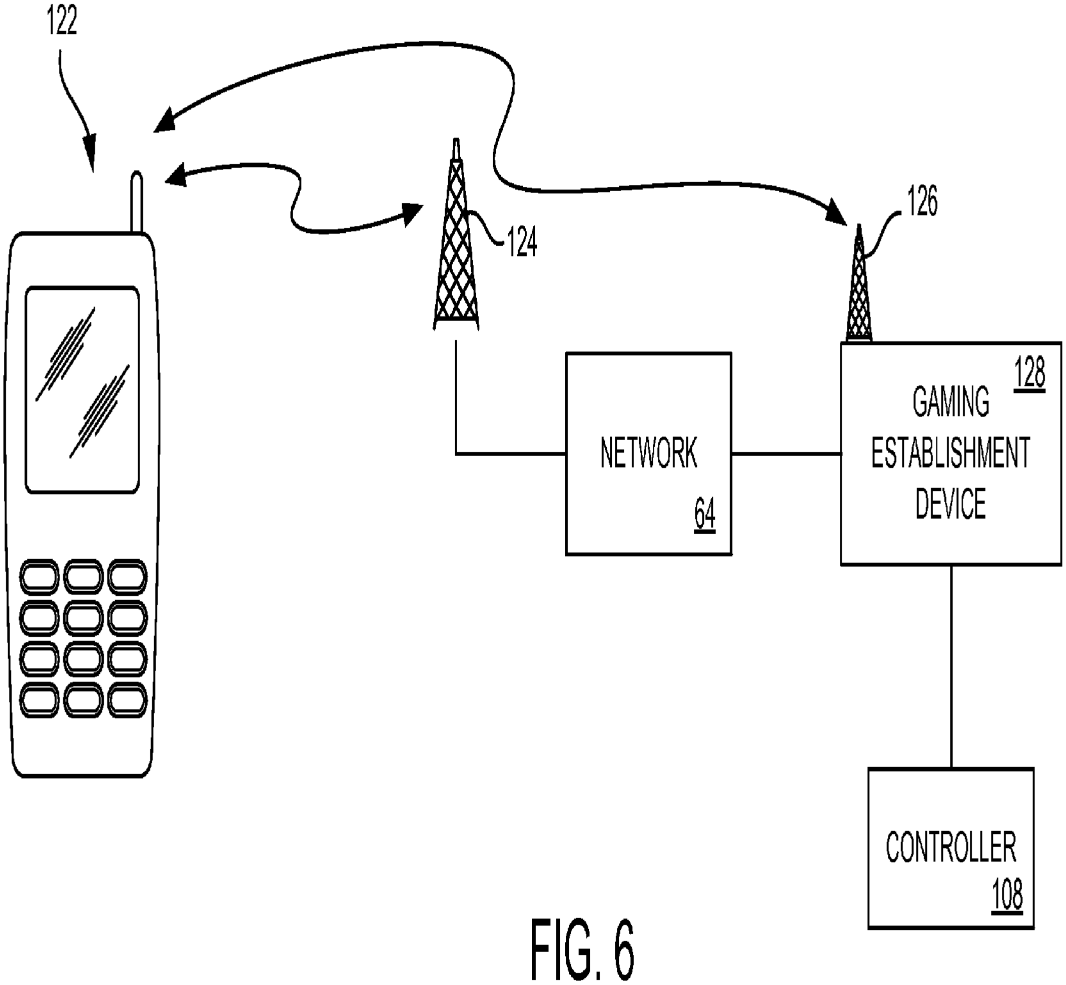
FIG. 6 illustrates a mobile terminal based embodiment of a roulette system suitable for use with the present invention.

As illustrated in FIG. 6, some embodiments allow operation with a mobile terminal 122 such as a cellular telephone, a personal digital assistant (such as a PALM® or BLACKBERRY™ device), a two way pager, a portable computer, a personal computer, a personal gaming device (such as the NINTENDO® GAMEBOY™), or the like as practical or desired. The mobile terminal 122 may act as a player station 36 or as a table 34 as practical or desired. The mobile terminal 122 may be a device dedicated to gambling or a multipurpose device such as a cellular phone on which games may be played as practical or desired. In a first embodiment, the mobile terminal 122 may be equipped with a user interface (keypad, display, etc.) that allows operation of a web browser (e.g., FIREFOX, MOZILLA, NETSCAPE NAVIGATOR, INTERNET EXPLORER, etc.) to interoperate with an online casino. The online casino may host a roulette game or download a roulette game to the mobile terminal 122 as practical or desired. In another embodiment, the mobile terminal 122 may instead communicate through the network 64 via a cellular microstation 124 so as to communicate with a gaming establishment device 128. In an alternate embodiment, the mobile terminal 122 may communicate directly with the gaming establishment device 128, such as through the communication mechanism 126. While wireless connections are shown, it should be appreciated that the mobile terminal 122 may dock with a communication port or be connected thereto through a wire or the like if practical or desired. The gaming establishment device 128 may be a table 34, a peripheral device, a dedicated interface device, or the like as practical or desired.

While it is particularly contemplated that the controller (not shown) of the mobile terminal 122 may control the mobile terminal 122, in an alternate embodiment, the online casino server, the table controller 40 of a table 34, or the controller 108 may control the gaming functions of the mobile terminal 122. Other arrangements are possible. For more information on the use of a mobile terminal as part of a gaming environment, the interested reader is referred to U.S. Pat. No. 6,846,238, which is hereby incorporated by reference in its entirety.

Note further that a mobile terminal 122 may be used by gaming establishment personnel to effectuate some of the functionality described herein. For example, it is possible that the croupier station 38 is embodied as a mobile terminal that communicates wirelessly with the table controller 40 or through the table 34 to the controller 108. Floor men, pit bosses and other gaming establishment personnel may be equipped with mobile terminals 122 to provide improved customer assistance.

Figure 7:
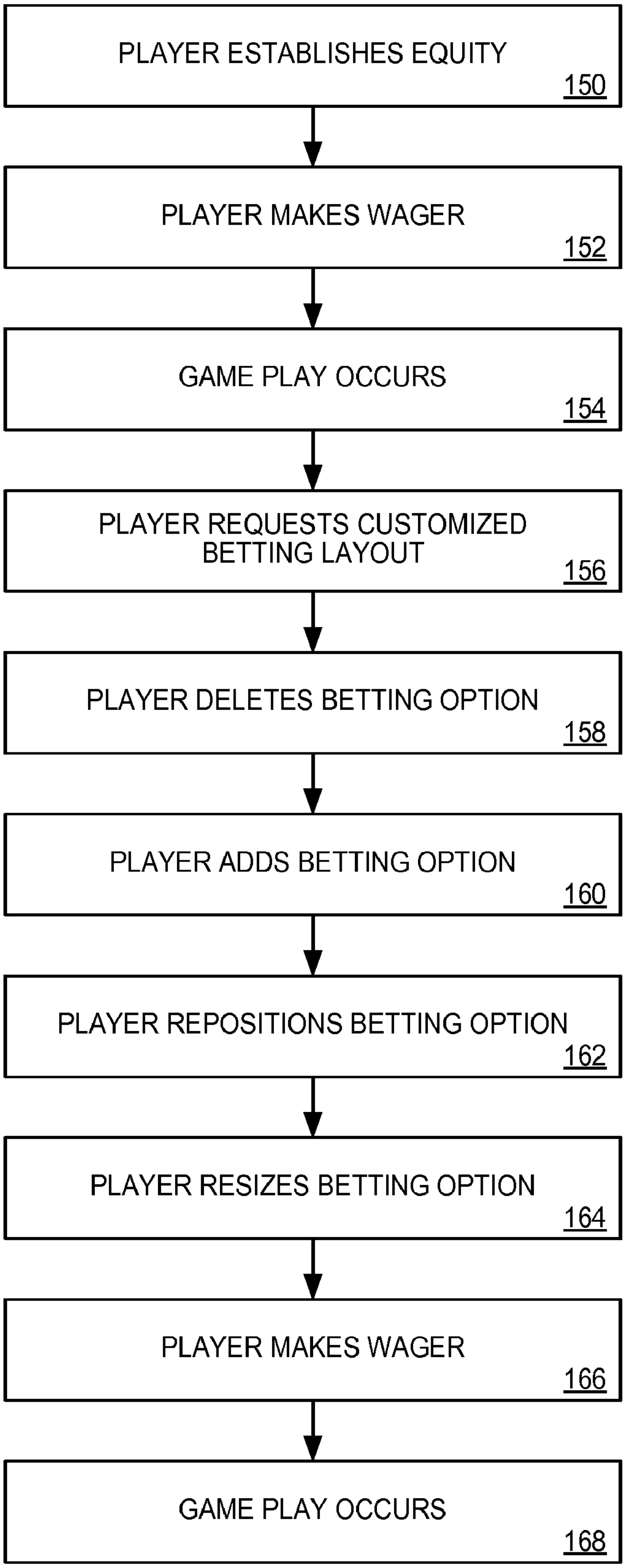
FIG. 7 illustrates a flow chart of an exemplary embodiment of the methodology of the present invention.

An exemplary methodology suitable for use with the elements set forth above is presented with reference to FIG. 7. Initially, a player establishes equity at a player station 36 (block 150). A player may establish equity by inserting coins into the coin acceptor 106, inserting any form of cash into a cash acceptor, using a credit card, inserting tokens, inserting a cashless receipt, billing a cellular account associated with a mobile terminal 122, or the like as practical or desired. The player may be presented with the standard betting layout 66 through which the player may make a wager (block 152) using the equity the player has established. In an exemplary embodiment, the display 48 is a touch screen, and the player taps the button (e.g., 68, 70, 72, etc.) or activates the shortcut indicia of the betting option the player wishes to use to make the wager. One tap may equal one coin and an additional tap may add a coin. As illustrated in FIG. 4, the current wager entry field 94 may summarize the information associated with the wager the player is actively entering along with a query as to whether the wager is correct.

The croupier begins spinning the wheel 42 and introduces the ball. The croupier closes betting, and game play generally occurs (block 154). Specifically, the ball lands in a cup and an outcome number is determined. This outcome number is compared to the numbers covered by the outstanding wagers and winners and losers are determined. Losing bets are collected and winning benefits are distributed. At some point during game play, the player may request a customized betting layout (block 156). In an exemplary embodiment, the player makes the request by pressing the make custom bet button 96. In another embodiment, the player informs the croupier or other gaming establishment personnel that she wishes to customize the betting layout. In still another embodiment, someone may suggest the player customize the betting layout. This suggestion may be accompanied by a prompt at the player station 36. The player may then make the request by answering the prompt affirmatively or, if the prompt is merely an instruction, the player may find the command that initiates the process.

Figure 8:
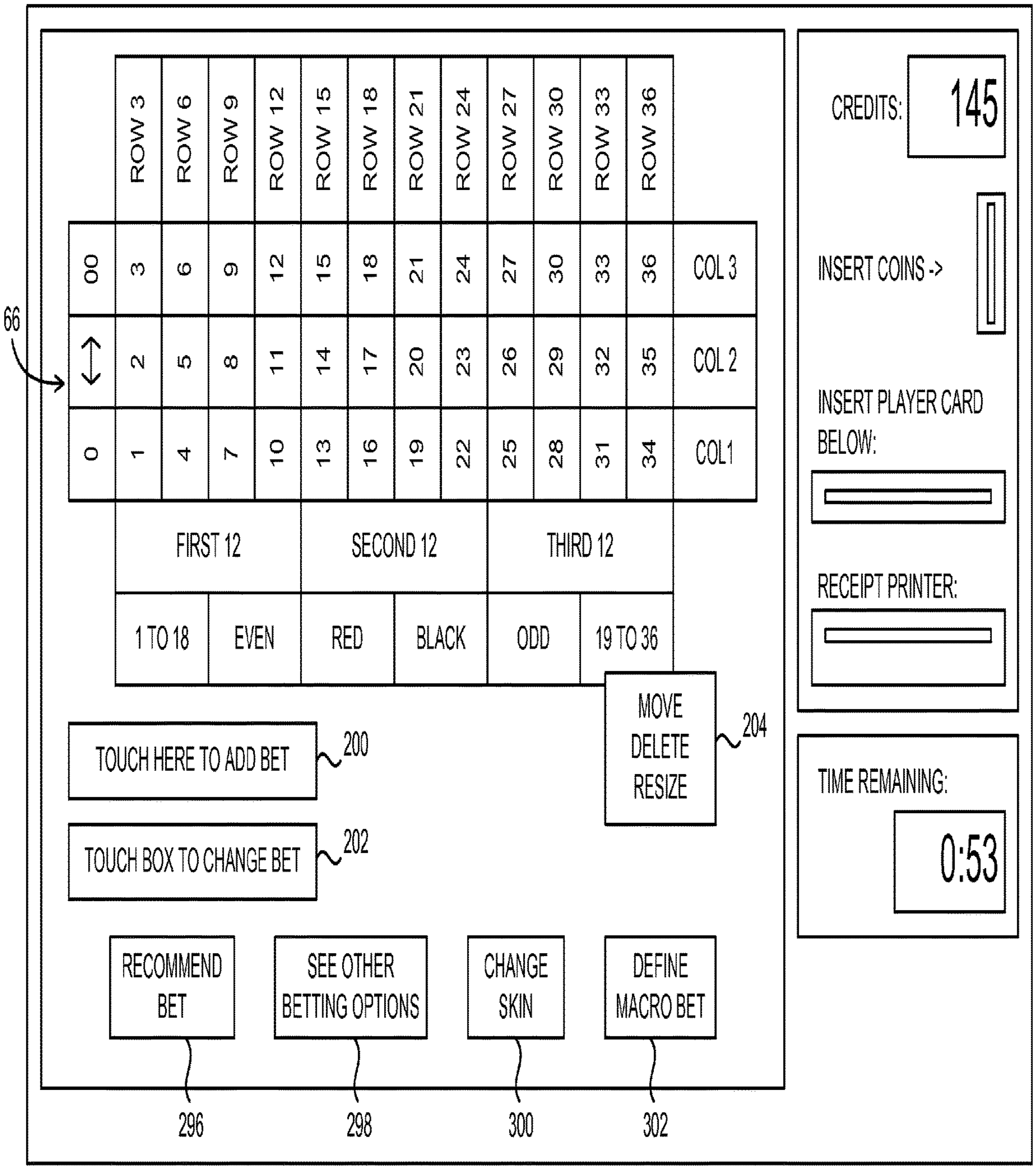
FIG. 8 illustrates an exemplary screen shot for customizing the betting layout in accordance with at least one embodiment.

In an exemplary embodiment, the display 48 may then change its appearance to that presented in FIG. 8. A "touch here to add bet" button 200 and a "touch box to change bet" instruction 202 are presented to the player to instruct the player how to change the standard betting layout 66. Touching a bet option button (e.g., box 68, 70, 72, 74, 76, 78, etc.) may cause a drop down menu 204 to appear with commands "move", "delete", and "resize" (or other menu command options) to appear. If the display 48 is not a touchscreen, similar commands may be made through a mouse or joystick. For example, instruction 202 could be changed to read "right click to change bet" or comparable prose.

Figure 9:
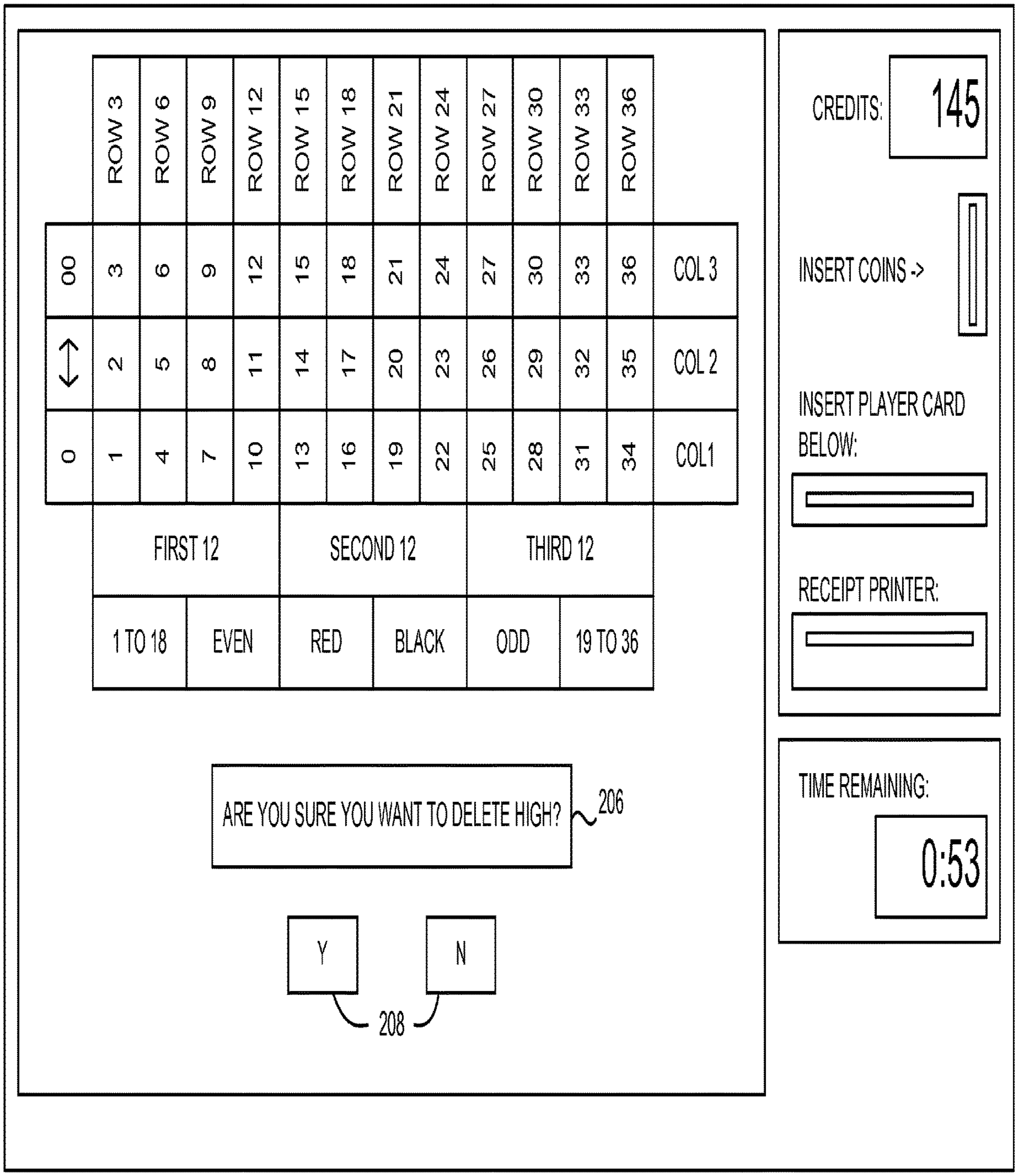
FIG. 9 illustrates an exemplary screen shot for deleting a betting option in accordance with at least one embodiment.

Returning to FIG. 7, the player may delete the shortcut indicia for a betting option (block 158) such as by selecting the "delete" command from the drop down menu 204 illustrated in FIG. 8. In such an instance, a confirmation query 206 with corresponding yes and no buttons 208 may be presented to the player as illustrated in FIG. 9. The query may explicitly inform the player what bet option is being deleted (e.g., high) or merely query the player to confirm the deletion. "Yes" and "no" buttons 208 may be used as practical or desired. The player may then return to a screen shot similar to that presented in FIG. 8, albeit with the deleted bet option removed from the player's view (not illustrated). Alternatively, the player may return to the wager entry screen of FIG. 4, again with the deleted bet option removed from the player's view. Note that once a betting option has been deleted a "restore" or "restore defaults" command may become enabled to add the deleted betting option back to the standard betting layout 66.

Figure 10:
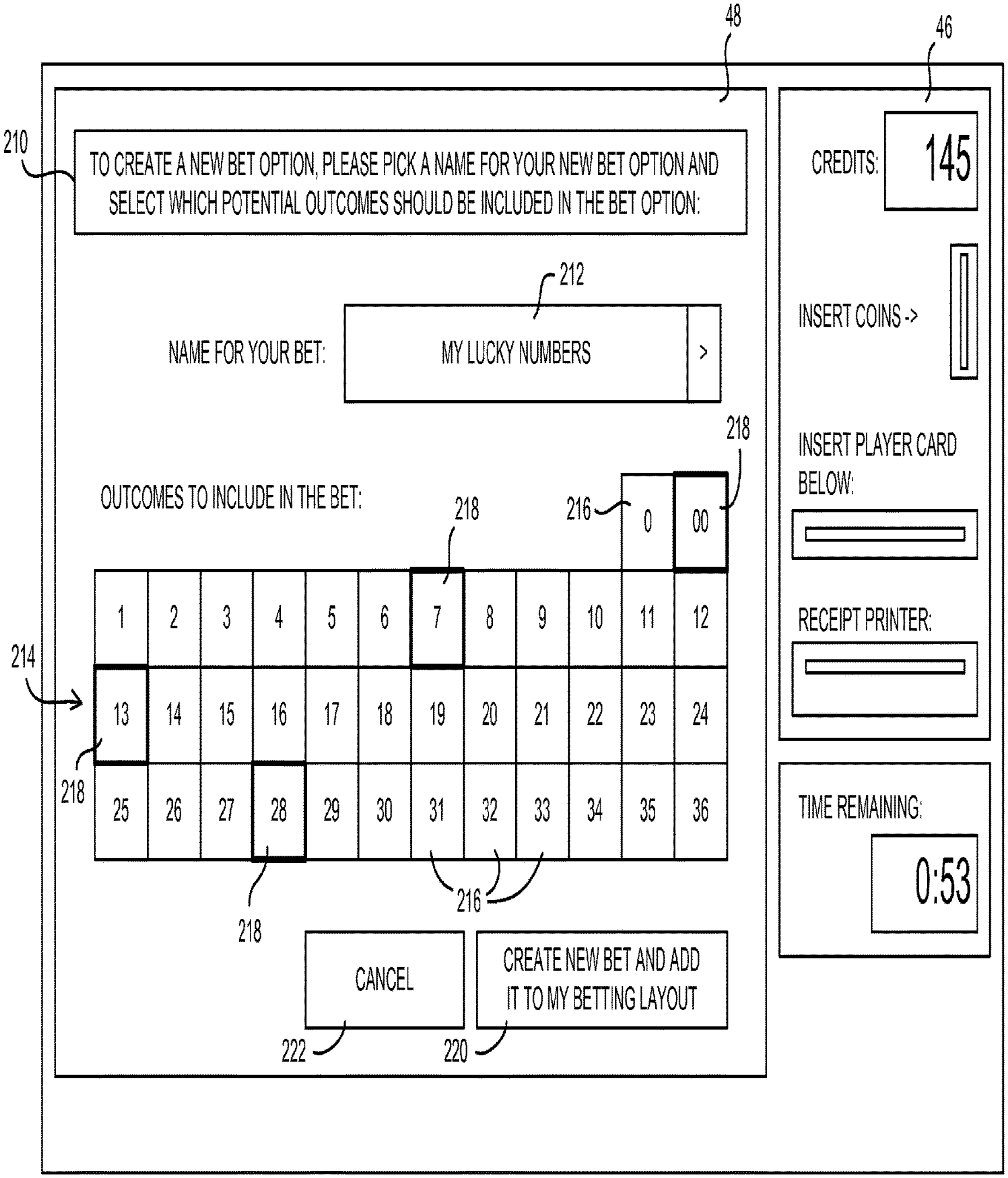
FIG. 10 illustrates an exemplary screen shot for adding a betting option in accordance with at least one embodiment.

The player may then add shortcut indicia for a betting option (block 160) such as by pressing the "touch here to add bet" button 200 (FIG. 8). For the purposes of illustration, the added bet will be a bet made from scratch, although, as explained below, selecting predefined nonstandard bets is also an option. Selection of the add a bet command may cause the display 48 to change to a screen shot similar to the exemplary screen shot illustrated in FIG. 10. The player may initially be instructed to pick a name for the new bet option through instruction indicia 210. The player may type in a name (e.g., "My lucky numbers") in a field 212. Such typing may be done through a keypad, via email/SMS from a mobile terminal 122, or the like as practical or desired. The player may then follow the further directions provided in instruction indicia 210 by selecting from a list of numbers 214, which individual numbers 216 are to be included in the new betting option. For example, as illustrated, the numbers double zero, seven, thirteen, and twenty-eight have been chosen and are highlighted by illuminated number fields 218.

In addition to selecting numbers from a list as illustrated, other possible betting formats may be provided. For example, a "multiples of" button may be provided. The player presses the "multiples of" button and then presses the number for which the function is to be calculated. To further the example, the player may press the multiples of button and then the four. This would select (perhaps by flashing, illumination or other visual indicia) four, eight, twelve, sixteen, twenty, twenty-four, twenty-eight, thirty-two, and thirty-six. While any number could be the operand on which the "multiples of" function operates, the most practical numbers are four through twelve. If the player chooses an operand higher than twelve, the function leads to only two or fewer numbers are being selected (e.g., selecting fourteen picks only fourteen and twenty-eight). Also, while a "multiples of" two and a "multiples of" three are possible bets, these bets already exist in the standard bets. I.e., two is the same as an "even" bet and three is the same as a third column bet.

If the player defines the bet from scratch, the system may determine odds and disclose the calculated odds to the player. More information about odds determinations is provided below with reference to Table 5. In short, the system may evaluate how many numbers are being used in the new bet, determine what odds would provide an appropriate house edge, and present the odds to the player. This may be done through direct calculations, reference to a look up table, an entry in a database, or the like. The player may be prompted as to whether they accept the odds for the bet. If not, the bet may be denied and the player may not be able to add the new bet to the customized betting layout. Alternatively, the system may ask the player to suggest odds, which are then sent to a controller or gaming establishment personnel for approval. If the odds are denied again, the player may have to accept the original odds offered or forego the desired betting option.

Instead of the player defining the betting option from scratch, the player may select from a list of predefined nonstandard bets. These may exist as buttons or selectable from a menu if practical or desired. For example, to see these other nonstandard bets, the player may press a "see other betting options" button 298 (FIG. 8). An exemplary list of potential predefined nonstandard bets is provided in Table 2.

TABLE 2

| Bet Option | Potential Outcomes |
|---|---|
| Red and Even | 12, 14, 16, 18, 30, 32, 34, 36 |
| Red and Odd | 1, 3, 5, 7, 9, 19, 21, 23, 25, 27 |
| Black and Even | 2, 4, 6, 8, 10, 20, 22, 24, 26, 28 |
| Black and Odd | 11, 13, 15, 17, 29, 31, 33, 35 |
| Reds >= 25 | 25, 27, 30, 32, 34, 36 |
| Blacks >= 25 | 26, 28, 29, 31, 33, 35 |
| Multiples of 4 | 4, 8, 12, 16, 20, 24, 28, 32, 36 |
| (Multiples of 4) + 1 | 5, 9, 13, 17, 21, 25, 29, 33 |
| Multiples of 5 | 5, 10, 15, 20, 25, 30, 35 |
| Multiples of 6 | 6, 12, 18, 24, 30, 36 |
| Multiples of 7 | 7, 14, 21, 28, 35 |
| Red Multiples of 7 | 7, 14, 21 |
| Black Multiples of 7 | 28, 35 |
| Multiples of 10 | 10, 20, 30 |
| Prime numbers | 2, 3, 5, 7, 11, 13, 17, 19, 23, 29, 31 |
| Red Primes | 3, 5, 7, 19, 23 |
| Black Primes | 2, 11, 13, 17, 29, 31 |
| Fibonacci Numbers | 0, 1, 2, 3, 5, 8, 13, 21, 34 |
| Red Fibonacci | 1, 3, 5, 21, 34 |
| Black Fibonacci | 2, 8, 13 |
| Doubles | 00, 11, 22, 33 |
| Digits Sum to 3 | 3, 12, 21, 30 |
| Digits Sum to 4 | 4, 13, 22, 31 |
| Digits Sum to 5 | 5, 14, 23, 32 |

Other sequences such as perfect numbers (defined as an integer which is the sum of its proper positive divisors), the first five digits of pi, the first five digits of e, and the like may also be used. The list is intended to be exemplary and non-limiting.

By pressing the see other betting options button 298, the list (or comparable interface element) of predefined nonstandard betting options is presented to the player and the player may make selections therefrom to add such a nonstandard bet to the betting layout.

External dates or the like may also be used. For example, holiday bets may include Christmas (twelve and twenty-five), Halloween (ten and thirty-one), the fourth of July (seven and four), Valentine's Day (two and fourteen), St. Patrick's Day (three and seventeen), April Fool's Day (four and one), and so forth. Such static numbers may be listed by the display in a format from which the player may make selections. Such options may be accessed through an "other options" menu or the like as practical or desired.

Instead of lucky numbers, the player may designate dates of significance to the player or other numbers such as a birthday, phone number, zip code, street number, anniversary, license plate number, hotel room number, weight, relatives', significant other, and/or acquaintances' birthdays, celebrity birthdays (e.g. Molly Parker's birthday is Jul. 17, 1972 or seven, seventeen, nineteen, seven, and two (note that the seven may be expressed as a double bet since it appears twice, or merely a single bet)).

Still other semi-static numbers may be provided from which the player may make selections. Holidays that move, such as President's Day, Memorial Day, Derby Day, Labor Day, Martin Luther King Jr. Day, Thanksgiving, Canada Day and the like may be programmed to correspond to the numbers associated with the date on which the holiday falls that year.

The numbers may be a function of external factors such as the current date, the current time, the last spin (selecting the number of the most recent spin), the last three spins (selecting the numbers on the three most recent spins), the top three spins in the last one hundred spins (e.g., based on a histogram of the last one hundred spins), bottom three spins in the last one hundred spins, previous winning lottery numbers, previous losing lottery numbers, current outside temperature, the phase of the moon (e.g., twenty-three if it is on the twenty-third day of the moon's twenty-eight day cycle), time of sunrise, time of sunset, and the like. Such numbers will change with some regularity, but are independently ascertainable by reference to the external criterion. The player station 36 may communicate with a remote website or other information source to secure the desired information or the information may be stored locally and updated regularly.

Still other variable or dynamic numbers may be selected by the player. For example, a quick pick function may be selected. Quick pick packages of one through eighteen numbers are specifically contemplated (e.g., quick pick six). The quick pick randomly selects an appropriate collection of numbers for the player when the player makes this wager. Note that as an additional option, if the player selects a quick pick command and receives a number that player does not desire, a regenerate or re-do command may allow different quick pick numbers to be selected. Other betting options include biometric data about the player such as blood pressure, temperature (either Celsius or Fahrenheit (e.g., three and seven or nine and eight), or the like. To assist the player station 36 in determining blood pressure, a blood pressure cuff or other sensor may be associated with the player station 36. Likewise, an infrared camera may detect a player's body temperature and provide the measurement to the player station 36.

Regardless of how the new betting option is created, once the player is satisfied, the player may press the "create new bet and add it to my betting layout" button 220. Alternatively, if the player has made a mistake, a "cancel" button 222 may be used to step backward through the process. Completion may take the player back to the screen of FIG. 8, albeit with a new bet option button presented or back to the wager entry screen of FIG. 4, again with the new bet option presented.

Figure 11:
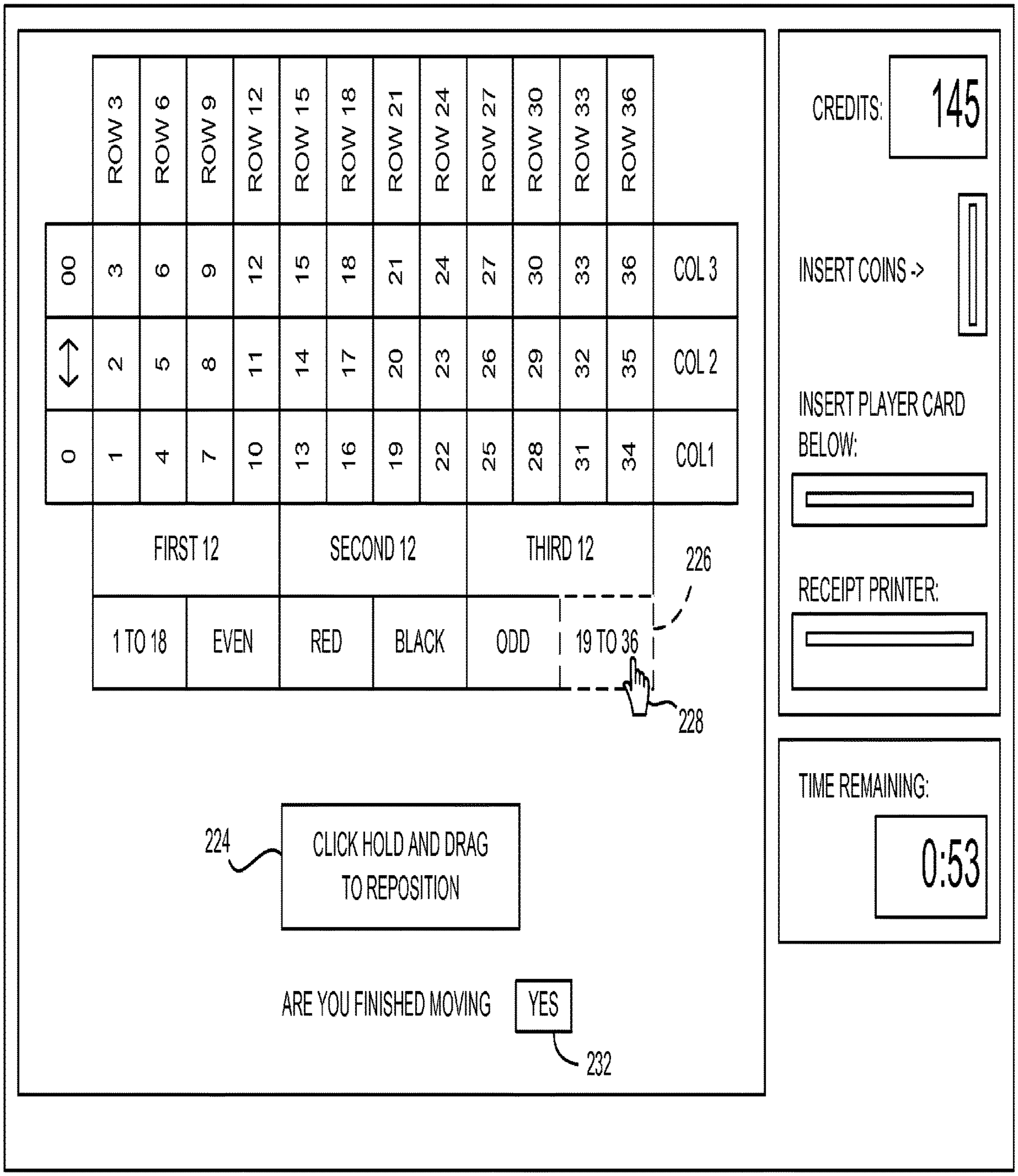
FIG. 11 illustrates an exemplary screen shot for moving a betting option in accordance with at least one embodiment.

Returning to FIG. 7, the player may further reposition the shortcut indicia of a betting option (block 162). Note that the player may reposition the default shortcut indicia (effectively customizing a layout even though the betting options remain the same) or the player may move a newly added shortcut indicium from its original position to a more convenient location. The player may select "reposition" or similar command from drop down menu 204 or otherwise instruct the player station 36 to reposition the betting option. An exemplary screen shot illustrating such an instruction received from the player is presented in FIG. 11. Instruction indicia 224 provide instructions on how the player is to reposition the shortcut indicia of the betting option. Further, the border 226 of the selected shortcut indicia is highlighted such as by blinking, providing a scrolling flashing portion, or the like. A hand 228 may be used to show a curser that is positioned over the selected shortcut indicia, and when the player clicks and drags, using the hand 228, the shortcut indicia to a desired location. Note that if the player repositions the moved shortcut indicia on top of other shortcut indicia, the now covered shortcut indicia may switch positions with the moved shortcut indicia, or, in a manner similar to inserting a cell in a table, the covered shortcut indicia may be moved up, down, left, or right as desired or indicated by the player. Additional query indicia 230 may ask the player if they are finished moving shortcut indicia. The player may indicate completion by pressing a yes button 232 or the like.

After the player completes the repositioning, the display 48 may return to the play mode of FIG. 4 or the customization screen of FIG. 8 as practical or desired.

Figure 12:
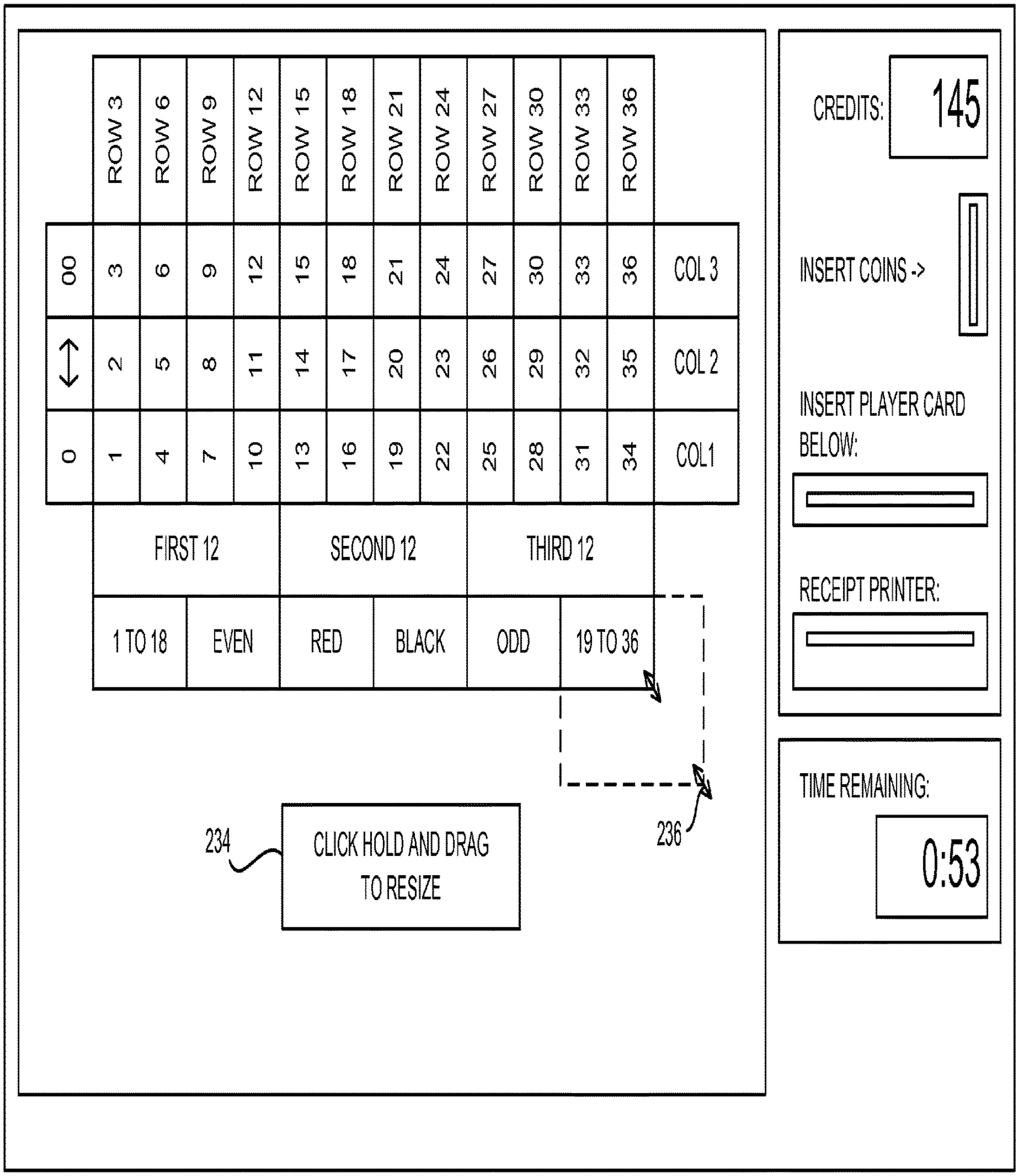
FIG. 12 illustrates an exemplary screen shot for resizing a betting option in accordance with at least one embodiment.

Returning to FIG. 7, the player may resize the shortcut indicia for a betting option (block 164). The player may select a "resize" or similar command from drop down menu 204 or otherwise instruct the player station 36 to resize the shortcut indicia. An exemplary screen shot illustrating such an instruction received from the player is presented in FIG. 12. Instruction indicia 234 provide instructions on how the player is to resize the shortcut indicia for the betting option. A resizing cursor 236 may appear, which when clicked and dragged causes the box associated with the shortcut indicia to resize in much the same way that a window in a WINDOWS operating environment is resized. After the player completes resizing, the display 48 may return to the play mode of FIG. 4 or the customization screen of FIG. 8 as practical or desired.

Figure 13:
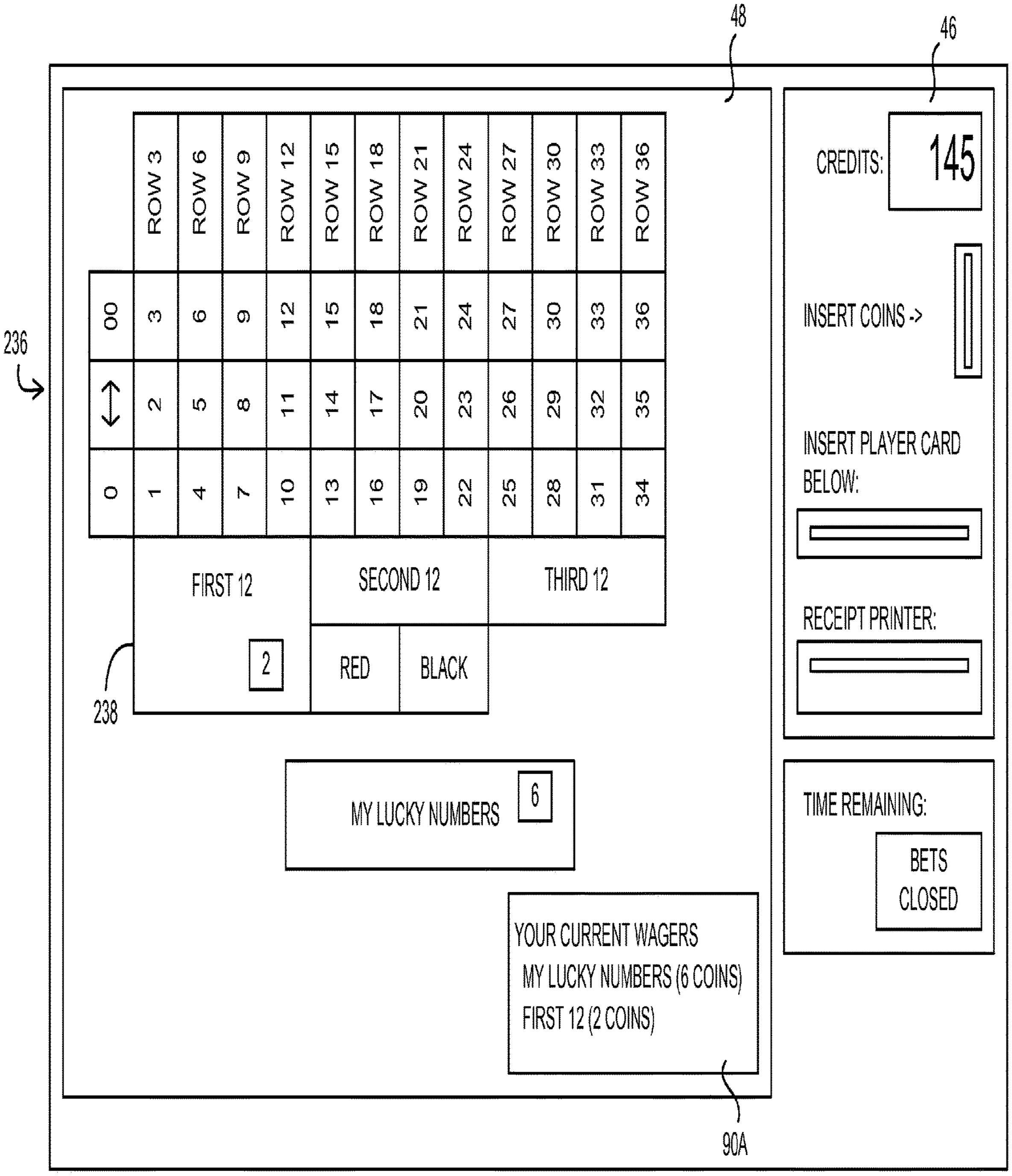
FIG. 13 illustrates an exemplary screen shot of a betting layout after customization in accordance with at least one embodiment.

Returning to FIG. 7, when the player returns to the play mode, the player may make a wager (block 166) using the new shortcut indicia and game play continues (block 168). For example, as illustrated in FIG. 13, a customized betting layout 236 is now presented on the display 48. In the customized betting layout 236, the player has deleted the column bets, the low, high, odd and even bets because the player knows that she never makes such bets. Likewise, the player has increased the size of the first twelve shortcut indicia 238 so that it is easier to select such bet option. Likewise, the player's customized lucky number bet now has its own shortcut indicia prominently displayed so that the player may easily select such a wager. The current wager display 90A reflects the player's current wagers.

When the player makes a change to the standard betting layout 66, exemplary command sequences have been provided. These examples are not intended to be limiting. Likewise, the order of the commands can readily be varied. Still further, not all commands need to be given. For example, some players may not need to delete any betting options and so may forgo such a command. In most embodiments, a control system (perhaps local controller 50, table controller 40 or controller 108) receives the instruction from the player concurrently with the player making the request. Alternatively, a player may make the request, and a croupier or other gaming establishment personnel may make the changes to the standard betting layout 66. Such personnel may make such changes through the player station 36, the croupier station 38, a mobile terminal or the like as practical or desired.

As an alternative to entering commands relating to modifying the betting layout 66 by drop down menus and the like, it is possible to provide two or more columns with an add/remove function therebetween. The first column may be the betting options that are currently displayed in the betting layout and the second column may be defined betting options that are not currently displayed in the betting layout. This list could be entitled "inactive bet options" or "all bet options" or the like as practical or desired. The player may select a betting option from one column and move it to the other column by actuating the add/remove function. As an alternative to an add/remove function, a drag and drop function could be used. Such dual column formats and commands to move elements from one column to the other are common in media players for selecting playlists or preparing to burn a disc.

While the discussion above focused on repositioning and resizing, other parameters related to the display of betting options may be modified, adjusted, or customized. For example, an additional command button of "modify" may be provided. When activated, this command sequence generates a menu with modification options such as change color, change position, change size, and the like. The player may select from these options, going through additional menus of commands as practical or desired to make the changes. A particularly contemplated embodiment may be to make the shortcut indicia for preferred bets a bright color so that those bets may readily be selected by the player. Alternatively, shortcut indicia for bets having bad odds may be color coded so as to remind the player that a particular bet is a poor odds bet (e.g., highlighted with red as a warning). Changing colors may be done through a menu, a color wheel, a list, or the like. Instead of naming a bet, an icon or other indicia may be used to indicate the bet. For example, a "My license plate numbers" style bet may be denoted with an image of a car instead of the text moniker "My license plate numbers".

As still another function of certain embodiments, a player may modify a customized bet option. For example, if the player decides that her lucky numbers are not so lucky and needs to update the lucky numbers, a command may be provided so that the player may change the numbers. Likewise, if the customized bet is a function of some other element, the player may change the function or update the source of the operand of the function.

Figure 14:
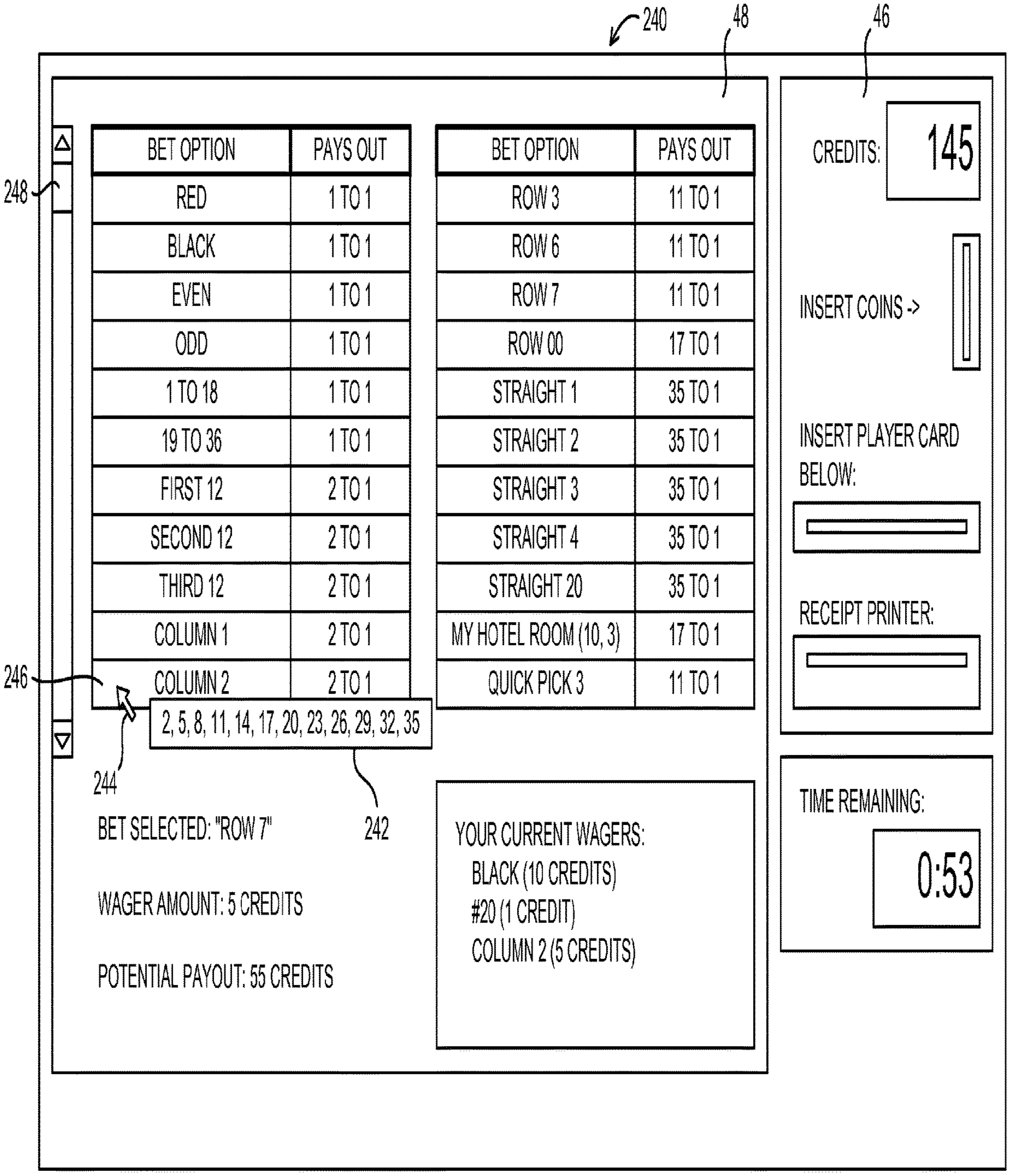
FIG. 14 illustrates an exemplary screen shot of a partial textual listing embodiment of the betting layout.

Another change the player may request is in how the betting options are presented. While the standard betting layout 66 is a simple presentation that provides an intuitive interface through which players may place bets, some players may find it confusing and prefer a textual listing of betting options. Thus, one embodiment, illustrated in FIG. 14, allows a player to change a betting layout from a graphically driven interface to a textual listing 240 of the bets. The textual listing 240 may have metadata 242 associated with it such that if a player positions a mouse curser 244 over an entry 246 in the list, a more detailed explanation of the numbers covered by the bet and other relevant information are provided. If the odds are not set forth in the textual listing, the metadata may list odds. A scroll bar 248 may allow the player to scroll through the betting options if they do not all fit on the display. Still other formats are possible including a graphical list, a tabular list, or the like. Likewise, while the present disclosure has focused on using a point and touch methodology to indicate wagers, checkboxes, drop down menus, text-fillable fields, or other interface elements may be used as practical or desired.

Note further that the predefined betting options need not all be presented to the player. Rather, the list of betting options may be based on one or more random numbers. For example, the list of betting options may be presented to the player like a Bingo card. Alternatively, only certain categories of players are presented with certain betting options. Such restricted betting options may provide better odds, more selection, or the like. In a specifically contemplated embodiment, only a player that has achieved a certain level in a player reward program is provided a selected VIP list of betting options. In another embodiment, only hotel guests (as indicated in the player-tracking database 310 described below) may be given access to additional betting options. As yet another alternative, the betting options may be stored in a searchable database. Note that options may be combined in whole or in part for some embodiments.

Note further that the predefined betting options may be tailored based on other players' activities. For example, if a first player places a bet on "red", then a second player may receive a list of predefined betting options that includes "black" or variations of black bets so that the gaming establishment may attempt to minimize its exposure from the established red bet.

While the exemplary embodiment presented with reference to FIGS. 7-13 is one embodiment of customization, other forms of customization are also possible. For example, a player may request a different skin for the betting layout 66. Skin is defined in the Rules of Interpretation set forth below. In one embodiment, the skin may change the names, appearance, size, and/or position of the shortcut indicia of the betting options. For example, the boxes could be changed from the spare, plain layout to a smiley face or the like.

In other skin embodiments, the potential outcomes associated with the bet options may be changed. Still other skin changes include colors, fonts, icons, and other graphics associated with the shortcut indicia for the betting options. A player may request a skin change through any appropriate command on the user interface 46 or by requesting a change to the croupier or other gaming establishment personnel. In an exemplary embodiment, the player may press a "change skin" button 300 (FIG. 8) on the display 48. Other specifically contemplated embodiments include selection from a drop down menu, typing a command into a keyboard, use of a mouse to select a button, and the like.

In another embodiment, the shortcut indicia for the betting options may be thematically changed. For example, a professional football themed skin may be applied, and the numbers changed to the logos for the professional football teams. Such logos are defined herein to be auxiliary indicia for the skin. If the wheel 42 is a virtual wheel, then the images on the wheel 42 may likewise change for that particular player station 36 to match the chosen skin. Otherwise, a control system such as local controller 50 or table controller 40 may translate between the standard numbers and the indicia associated with the skin.

Table 3 presents a brief exemplary summary of how wheel 42 maps to such a football themed skin. Note that there are currently thirty-two teams in the NFL, but thirty-eight potential outcomes on a U.S. style wheel. To compensate, there would be six non-team bet options associated with six of the potential outcomes (e.g., thirty-three through thirty-six, zero, and double zero).

TABLE 3

| Bet Option in NFL Skin | Associated Outcome(s) on Roulette Wheel | Payout |
|---|---|---|
| Buffalo Bills | 1 | 35 to 1 |
| Miami Dolphins | 2 | 35 to 1 |
| New England Patriots | 3 | 35 to 1 |
| New York Jets | 4 | 35 to 1 |
| Baltimore Ravens | 5 | 35 to 1 |
| Cincinnati Bengals | 6 | 35 to 1 |

TABLE 3-continued

| Bet Option in NFL Skin | Associated Outcome(s) on Roulette Wheel | Payout |
|---|---|---|
| Cleveland Browns | 7 | 35 to 1 |
| Pittsburgh Steelers | 8 | 35 to 1 |
| Houston Texans | 9 | 35 to 1 |
| Indianapolis Colts | 10 | 35 to 1 |
| Jacksonville Jaguars | 11 | 35 to 1 |
| Tennessee Titans | 12 | 35 to 1 |
| Denver Broncos | 13 | 35 to 1 |
| Kansas City Chiefs | 14 | 35 to 1 |
| Oakland Raiders | 15 | 35 to 1 |
| San Diego Chargers | 16 | 35 to 1 |
| Dallas Cowboys | 17 | 35 to 1 |
| New York Giants | 18 | 35 to 1 |
| Philadelphia Eagles | 19 | 35 to 1 |
| Washington Redskins | 20 | 35 to 1 |
| Chicago Bears | 21 | 35 to 1 |
| Detroit Lions | 22 | 35 to 1 |
| Green Bay Packers | 23 | 35 to 1 |
| Minnesota Vikings | 24 | 35 to 1 |
| Atlanta Falcons | 25 | 35 to 1 |
| Carolina Panthers | 26 | 35 to 1 |
| New Orleans Saints | 27 | 35 to 1 |
| Tampa Bay Buccaneers | 28 | 35 to 1 |
| Arizona Cardinals | 29 | 35 to 1 |
| St. Louis Rams | 30 | 35 to 1 |
| San Francisco 49ers | 31 | 35 to 1 |
| Seattle Seahawks | 32 | 35 to 1 |
| Touchdown | 33 | 35 to 1 |
| Field Goal | 34 | 35 to 1 |
| Safety | 35 | 35 to 1 |
| Extra point | 36 | 35 to 1 |
| Fumble | 0 | 35 to 1 |
| Interception | 00 | 35 to 1 |
| AFC East | 1, 2, 3, 4 | 8 to 1 |
| AFC North | 5, 6, 7, 8 | 8 to 1 |
| AFC South | 9, 10, 11, 12 | 8 to 1 |
| AFC West | 13, 14, 15, 16 | 8 to 1 |
| NFC East | 17, 18, 19, 20 | 8 to 1 |
| NFC North | 21, 22, 23, 24 | 8 to 1 |
| NFC South | 25, 26, 27, 28 | 8 to 1 |
| NFC West | 29, 30, 31, 32 | 8 to 1 |
| Scores | 33, 34, 35, 36 | 8 to 1 |
| Turnovers | 0, 00 | 17 to 1 |
| AFC | 1-16 | 1 to 1 |
| NFC | 17-32 | 1 to 1 |

Other exemplary skins include, but are not limited to: automobiles, comic book characters, zodiac symbols, cities/regions of the United States or other geopolitical entity, movies, television shows, and the like. Symbols, images, and the like that are used to implement the skins are also defined to be auxiliary indicia.

As alluded to above, different skins may be used for different player stations 36 while using the same wheel 42. As noted above, a control system may provide the translation between the numbered cup in which the ball lands and the appellation given to that cup by the player's chosen skin. Additionally, a translation schedule or table may be displayed continuously on the display 48 if practical or desired. Alternatively a print out may be provided from a receipt printer or other location.

As another exemplary embodiment, players may define "macro" bets. Macro bets may be amalgamations of other bets. For example, a player may define a "My Lucky Bets" macro bet that automatically places bets on each of the player's three favorite bet options: Quick Pick four, bottom three in last one hundred spins, and yesterday's high temperature. In addition to defining particular bets, a macro bet may also define coin amounts for each of the bets included in the macro bet. For example, a macro may be defined that automatically places five coins on red, two coins on seven, and three coins on column one or other bets/coin distributions as practical or desired. Thus, a macro bet may select at least one bet option on a player's behalf and may further select at least one wager amount on the player's behalf.

A player may define a macro bet through any appropriate command on the user interface 46 or by requesting that the croupier or other gaming establishment personnel define and enable a macro bet on the player station 36. In an exemplary embodiment, the player may press a "define macro bet" button 302 (FIG. 8) on the display 48. Other specifically contemplated embodiments include selection from a drop down menu, typing a command into a keyboard, use of a mouse to select a button, and the like.

Once the player has indicated a desire to define a macro bet, the player may indicate one or more bet options that are to be included in the macro. This process may be similar to the process of defining a "My Lucky Numbers" bet set forth above. The player may then indicate a wager amount for each selected bet option. Note that the precise order may be varied. Further, the player may verbally express this information to a croupier or other gaming establishment personnel and that person program the player station 36 (either directly or remotely (e.g., through croupier station 38 or a mobile terminal)) to enable the desired macro bet.

Once a macro bet has been defined, shortcut indicia for the macro bet may be added to the customized betting layout 236 using any of the techniques set forth herein. Further, a new option may be added to the menu of available options, namely "modify macro bet". The player may select this command and modify, add, and/or delete betting options from the macro bet as practical or desired. Modification may be made to the shortcut indicia for the macro bet or to the actual wagers being placed by the macro bet as practical or desired.

Note that while the above embodiments focus on a single ball table, the opportunities for mixing betting options increases dramatically with a multi-ball table. For example, for a two ball wheel, two skins could be used concurrently or differing betting layouts may be created and used concurrently for the multi-ball table.

Some exemplary, but non-limiting multi-ball bets are set forth in Table 4.

TABLE 4

| Bet Option | Potential Outcome for Spin/ Ball #1 | Potential Outcome for Spin/ Ball #2 | Potential Outcome for Spin/ Ball #3 | Further Details |
|---|---|---|---|---|
| Pick 2 | number selected by player | same number as spin/ball #1 | N/A | Player has to match both spin/ ball #1 and spin/ball #2 to win. |
| Pick 3 | number selected by player | same number as spin/ball #1 | same number as spin/ball #1 | Player has to match spin/ball #1, spin/ball #2, and spin/ ball #3 to win. |
| Repeat 2X | any number | same number as spin/ball #1 | N/A | the same number comes up twice in a row on the next 2 spins |
| Repeat 3X | any number | same number as spin/ball #1 | same number as spin/ball #1 | the same number comes up twice in a row on the next 3 spins |
| Sequence 2X | any number | 1 + number from spin #1 | N/A | Sequential numbers on next 2 spins (e.g., 15 on spin A, then 16 on spin B) |

TABLE 4-continued

| Bet Option | Potential Outcome for Spin/ Ball #1 | Potential Outcome for Spin/ Ball #2 | Potential Outcome for Spin/ Ball #3 | Further Details |
|---|---|---|---|---|
| Sequence 3X | any number | 1 + number from spin #1 | 2 + number from spin #1 | Sequential numbers on next 3 spins (e.g., 15 on spin A, then 16 on spin B, 17 on spin C) |
| Sequence Down 2X | any number | (number from spin #1) − 1 | N/A | Sequential numbers on next 2 spins (e.g., 16 on spin A, then 15 on spin B) |
| Red 2X | red | red | N/A | both of next two spins will be red numbers |
| Black 3X | black | black | black | next 3 spins will all be black numbers |
| Ordered Date | current month (e.g., 5 for May) | current day (e.g., 3 for May 3rd) | N/A | Note that holidays, birthdays, and the like as previously discussed may be used. |

Other multi-ball betting options exist and may be defined as practical or desired.

As a variation, a player may place a cumulative bet that bets on whether one or more other bets will be successful. For example, a player may bet that she will win eighty percent of the time during the next twenty spins. This particular form of cumulative bet may be particularly attractive to a gaming establishment as it effectively incentivizes a player to continue playing for the additional twenty spins covered by the bet to determine an outcome thereof. In a first variation, the player may make individual bets on each of the spins within the cumulative bet. In a second variation, the player makes a single selection that is applied to each of the spins within the cumulative bet. While twenty spins have been set forth explicitly, other numbers of spins may be covered by the cumulative bet.

As an extension of the customization of the betting layout 236, some embodiments allow players to store their customized betting layouts. In a first embodiment, this information may be stored in a player-tracking database. An exemplary player-tracking database 310 is illustrated in FIG. 15. The player-tracking database 310 may include a player identifier field 312, a name field 314, an address field 316, a player since field 318, a total wagered field 320, a hotel guest field 322, a theoretical win field 324, a most frequent roulette bet field 326, and a stored roulette bets field 328.

The player identifier field 312 may include a unique alphanumeric code which identifies the player from all other players in the database 310. Alternatively an image or other unique identifier may be stored in this field. The name field 314, address field 316, and player since field 318 may be established when the player registers with the gaming establishment and may be provided by the player or dictated by the time at which the application was received. The total wagered field 320 may indicate the amount the player has wagered while being tracked as part of the player-tracking membership.

The hotel guest field 322 simply denotes whether the player is a guest of the hotel associated with the gaming establishment. The theoretical win field 324 is closely tied to the total wager field 320, but is generally considered a more accurate representation of the player's worth to the gaming establishment.

The most frequent roulette bets field 326 may store information about the player's most frequent bets at a roulette table. This information may be derived through electronic observation based on tracking usage of a player station 36, as reported by gaming establishment personnel, as indicated by video recordings from security cameras, or the like as indicated by the player. In all circumstances, the empirically derived data may be used to update the information in the field 326. Updating may be done periodically based on time, number of spins, amount wagered, or other metric as practical or desired. Updating could also be performed based on a request by the player, a command by gaming establishment personnel, a request by some other party (e.g., a spouse, an acquaintance, a regulator), or the like as practical or desired. In the illustrated database 310, some players have multiple most frequent bets stored. One or more most frequent bets may be stored as practical or desired. A decision to store more than one most frequent bet may be a function of at least a minimum wager being made for that betting option, that bet being made on a predetermined number of spins, at the request of the player, at the request of gaming establishment personnel or the like as practical or desired.

The stored roulette bets field 328 is similar to the most frequent bet field 326, but reflects the bets that the player actually has stored and associated with the player's profile. For example, if the entry for the most frequent roulette bets field 326 is empirically derived, storage in the stored roulette bets field 328 may require player approval or authorization. Data from the stored roulette bets field 328 may be used to customize the betting layout automatically whenever the player uses the player's player-tracking mechanism at a player station 36. As such, for player P-106999, the field 328 lists a customized "My Favorite" bet including three, eight, and thirty-four for twenty dollars and black for five dollars, but resized (dimensions omitted for clarity). Other customizations may be included as well such as skins, color changes, font changes, relocations, deletions from the betting layout, and the like.

While not shown, it may also be possible to store information about how frequently a stored bet or a most frequent bet wins or loses. Such information may be maintained in confidence by the gaming establishment or shared with the player as practical or desired. Note that other fields may be present and not all of the fields recited herein need be present for all embodiments.

Figure 16A:
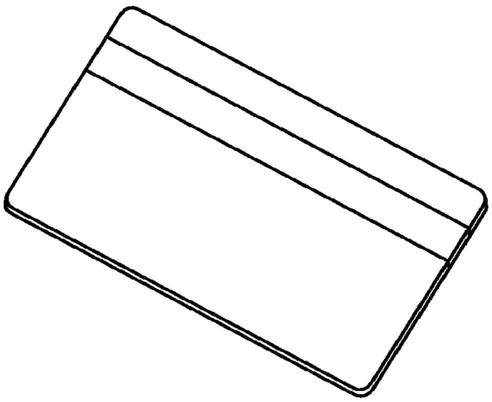
FIGS. 16A-16C illustrate exemplary player-tracking mechanisms.
Figure 16B:
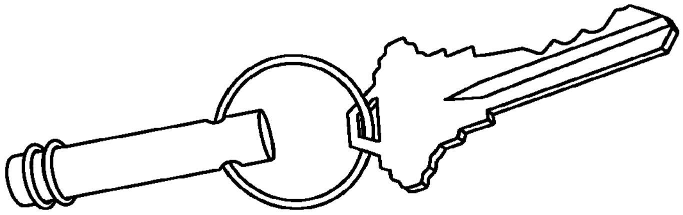
Figure 16C:
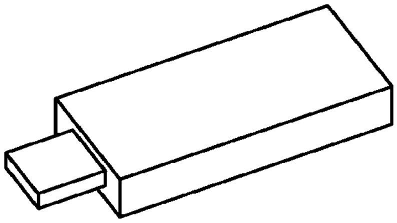

The player-tracking database 310 may be associated with a player-tracking mechanism. Exemplary player-tracking mechanisms 330A-330C are illustrated in FIGS. 16A-16C respectively. Player-tracking mechanism 330A is a magnetic card similar to a credit card. Player identifying information may be stored on the magnetic stripe and the player-tracking database 310 accessed by the controller associated with the card reader that reads the card. Player-tracking mechanism 330B is an RFID transponder embedded in a keychain fob. Use of such fobs is well known in the RFID industry as illustrated by the EXXON MOBIL SPEEDPASS system. Player-tracking mechanism 330C is a dongle or USB memory stick. Other player-tracking mechanisms include smart cards, tokens, paper receipts with a bar code or other indicia thereon to identify the player, and the like.

In use, the player may approach a player station 36, use the player's player-tracking mechanism 330, and establish equity. The local controller 50 (or other controller) may access the player-tracking database 310 and retrieve the stored bets from the stored roulette bets field 328 and may update the standard betting layout 66 to the customized betting layout 236 based on the information stored therein. Note that if the player-tracking mechanism 330 has sufficient memory, it may store the player's customized betting layout 236 on the player tracking mechanism 330. Then, when used, the local controller 50 (or other controller) may copy the information from the player tracking mechanism and generate the customized betting layout 236.

In place of a player-tracking database 310, a specialized player configuration database may be used. This player configuration database may store information about the player's customized betting layouts and betting history, but not some of the other information that may be in the player-tracking database. A player may have a player configuration card that identifies the player and links the player to the entries in the player configuration database. Alternatively, the player configuration information may be stored on the player configuration card. While the player configuration card may store the player's preferred customized betting layout 236 (or information sufficient to find such information at a remote location such as a database on the controller 108), the configuration card could instead store configurations preprogrammed by the gaming establishment. For example, the gaming establishment may create a "holiday bets" configuration card (or series of cards) that include markings that designate a holiday and create shortcut indicia for a bet associated with the corresponding holiday (e.g., a Christmas card could have shortcut indicia for a twelve/twenty-five bet).

The configuration card may add shortcut indicia for betting options, create new betting options, remove betting options, modify betting options, do any of this to the shortcut indicia for betting options, and/or a combination of these features. Further information on the configuration card may include a name or identifier for a bet option, one or more potential outcomes to be included in the bet option, and the like.

The configuration card may be a magnetic card, a smart card, an RFID transponder, a dongle, a USB stick or the like. Alternatively, the card may be a piece of paper or plastic with printed indicia that describes the one or more bet options stored on the card. These indicia may be computer readable such that the card may be read to customize the betting layout per the instructions embedded in the printed indicia. In another embodiment, the configuration card may be more akin to a SCANTRON card with bubbles that may be filled in (with a #2 pencil) to provide the indicia that is then read to customize the betting layout. In place of marked bubbles, hole punches, or other markings may be used. If the card has multiple bet option customizations stored thereon, the markings may indicate which of the multiple bet options is to be implemented (e.g., for a holiday card, July 4$^{th}$ could be marked out of the set of the holidays stored on the card). In effect, such configuration cards may allow the player to customize the betting options off-line so that the player may use the card at a player station 36 and immediately be able to access the customized betting layout 236 created by the card rather than spend time customizing the layout by stepping through the menus and commands.

In an alternate embodiment, the player configuration card may be created remotely. A player may log in to a website and make a customized betting layout 236 using any appropriate commands and then request that the customized betting layout 236 be downloaded to a player configuration card that the player may pick up at check in or at a customer service booth in the gaming establishment. This approach may be particularly useful if the configuration card is sold as part of a gaming package. Alternatively, a print out with computer readable indicia may be created that serves as the player configuration card. The indicia are then read by the player user interface 46 or the croupier user interface 52 as practical or desired to customize a player station 36. The player may access the website using a computer, mobile terminal, or other device as practical or desired.

In still another embodiment, the player may create a configuration card at a kiosk associated with the gaming establishment. The player may step through the commands and options on the kiosk to create a customized betting layout 236 and then download the customized betting layout to a configuration card. In place of a kiosk, a step top box in a hotel room or other device may be used to allow the player to create the configuration card.

Again, the kiosk, set top box, and other remote creations of the configuration cards allow the players to create the customized betting layouts 236 offline in an unhurried manner so that when the player approaches a table 34 the player is ready to play and does not need to spend time at the table creating the customized betting interface 236.

Note that such offline creation may be extended to the player-tracking database 310 or otherwise performed without the need for a configuration card. A player may log in to the player-tracking database 310 from a device and enter information into the stored bet field 328 to create the customized betting layout 236. The device may be a mobile terminal 122, a computer, a kiosk, a gaming establishment device 128 or the like. The player may log into a website or other interface as practical or desired. Note that other portions such as the theoretical win may be inaccessible to the player so that the player may not change the other data in the database 310. In still another embodiment, rather than let the player have access to the player-tracking database 310, the player may log into a website, enter the information related to the customized betting layout 236 and then submit the information for inclusion in the player-tracking database. Date entry in either case may be made by the player alone, in combination with another person (e.g., family member, gaming establishment personnel, friend, acquaintance, and the like) based on player preferences or recommendations received from other people and/or machines. Again, firewalls and the like may be used to safeguard proprietary data within the player-tracking database 310. Then, when the player uses a player-tracking card, the customized betting layout 236 is automatically loaded from the database and the player may begin play using the customized betting layout 236. In some embodiments, the customized betting layout 236 may initially be stored on the mobile terminal 122 and then selectively downloaded to the player station 36 when the player links the mobile terminal 122 to the player station 36 or otherwise interfaces the mobile terminal 122 with the network 64 (or network 44).

As a variation on the offline creation of the customized betting layout 236, the player may provide elements to be incorporated into the betting layout (e.g., as a skin or the like). For example, the player may upload a picture of family members, favorite sports icons, pets, cars, or the like, and these pictures may be incorporated into the betting layout, either as the indicia within the shortcut indicia, or as a background image (e.g., like a wallpaper on a computer desktop). A specific example is a spouse's birthday bet could be denoted with a picture of the spouse. Audio files or other electronic media may be uploaded and used in this manner as practical or desired. Note that such could be provided at a gaming table if the player station were equipped with a scanner, input port, or the like to accept the input from the player, but such may slow play in an undesirable manner or be cost ineffective.

While it is possible to let the players determine when and how to customize the betting layout 66, it is also possible to recommend customized betting options to players. An exemplary methodology is set forth in flow chart form in FIG. 17. The method begins when the player establishes equity (block 350). Game play occurs (block 352) with the player making bets through the player station 36 as previously described. An entity monitors the wagers made by the player (block 354). An in exemplary embodiment, a control system such as the local controller 50, the table controller 40, or the controller 108 monitors the player's inputs at the user interface 46 to monitor the player's wagers. If the player is using a mobile terminal 122, then the control system of the mobile terminal may also perform the monitoring. In another embodiment, human observation monitors the player's wagers. The human observation may be provided directly such as the croupier making notations about wagers through the croupier station 38, a floor man or other gaming establishment personnel watching the player's wagers and entering notations through a mobile terminal, audible recordings through a voice activated player tracking system such as the BLOODHOUND system, or the like. The human observations may be indirect, such as by viewing camera recordings of the player. Such camera recordings may be from security cameras or the like. As yet another variation, another player may make a recommendation about a betting option or customized betting layout. For example, if a first player detects a second player taking an inordinate amount of time placing a variety of disparate bets consistently, the first player may recommend to the second player that the bets be consolidated into a single customized betting option. Likewise, if a player feels that a betting option is due or hot, then the player may share this betting option with other players at the table with instructions on how to implement the betting option. A spouse, family member, or bystander may make similar suggestions and recommendations to players.

Figure 17:
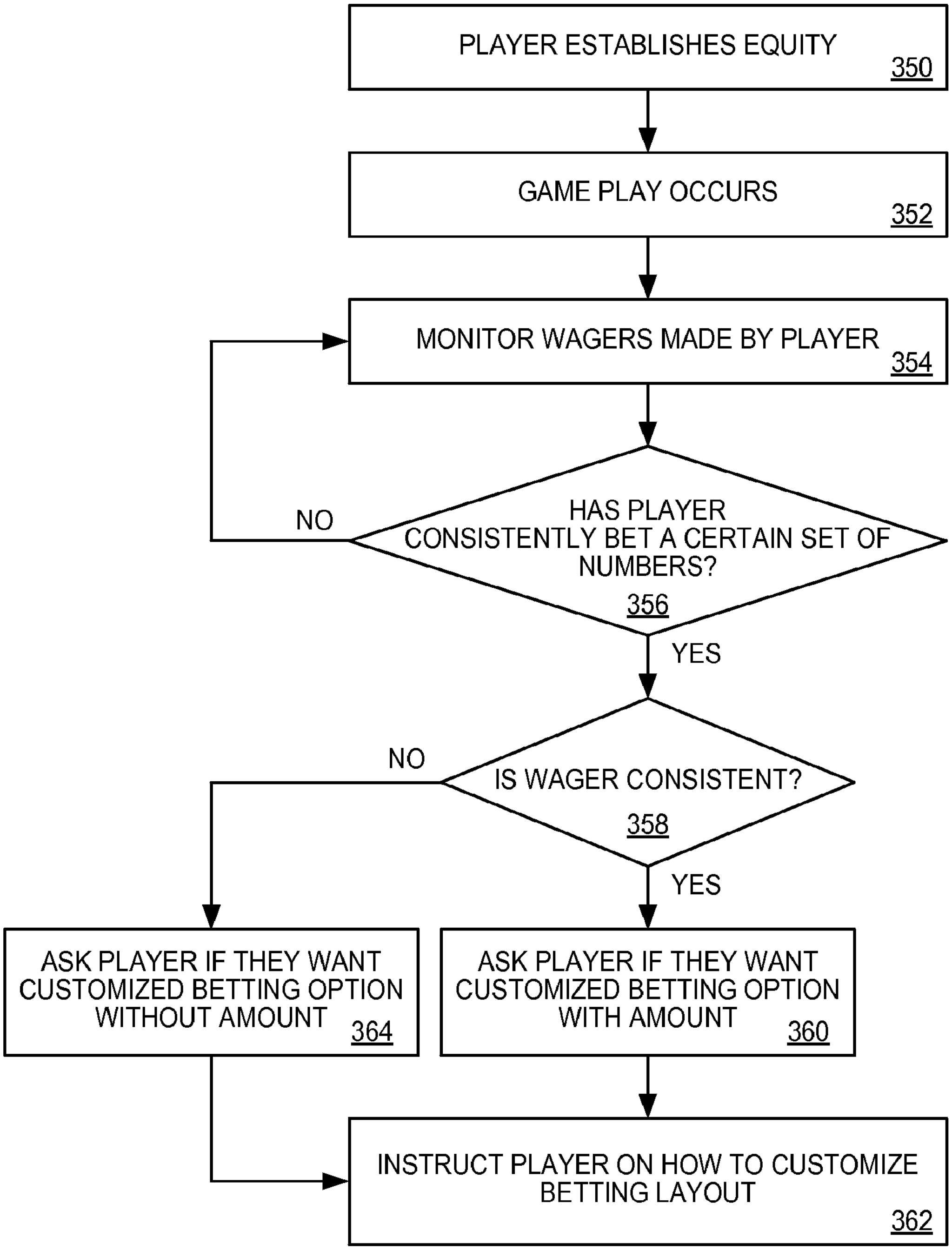
FIG. 17 illustrates an exemplary methodology for recommending betting options to players.

Returning to the methodology of FIG. 17, a control system determines if the player has consistently bet a certain set of numbers (block 356). A counter may be incremented each time a bet is made on that number to see if a number has been bet more than a predetermined threshold; a total wager on the number may be calculated and compared to a predetermined threshold; a counter may be used to determine if a player bets on the same numbers a predetermined number of times consecutively, where the counter may be reset if the player does not make the wager; or the like as practical or desired.

The control system determines if the wager is consistent (block 358). That is, does the player vary the amount of the wager or does the player routinely bet the same amount on a particular number (or set of numbers). A determination as to whether a wager is consistent may be made by comparing the number of times the wager is made at a particular dollar amount to a threshold. Alternatively, an average wager amount may be compared to a predetermined threshold. For example, if the player wagers the same amount seventy-five or more percent of the time, then the control system may determine that the wager is consistent.

If the wager is consistent, then a message may be sent to the display 48 asking the player if they want a customized betting option with the consistent wager amount added to their betting layout (block 360). In an alternate embodiment, the message is sent to the croupier station 38 or other device associated with gaming establishment personnel, and the croupier or other personnel verbally asks the player the same query. If the player acquiesces, then the display 48 may provide instructions on how to customize the betting layout (block 362). Such instructions may be generated by software associated with one or more of the control systems and may include pop up windows, a side bar help screen, an animated assistant, or the like. Alternatively, gaming establishment personnel may verbally walk the player through the process of customizing the betting layout. Such verbal assistance may further include sending instructions to the player station 36 from the croupier station 38 or other remote location, wherein the instructions then appear on the display 48. Still another variation includes the gaming establishment personnel actively assisting the player implement the customization to the betting layout. The personnel may provide a verbal commentary on what they are doing so that the player may perform further customization without the assistance of the personnel.

If the player is not making consistent wagers at block 358, the player may still be asked if they want to customize the betting layout, but such a query may be made without a wager amount. (block 364). Again, this can be done through the display, by personnel or other technique as practical or desired. If the player acquiesces, then the method may move to the instructions of block 362 as previously explained.

In place of the inferential technique of recommending bets, the player may request that a bet be recommended. This request may be verbal to the croupier or other gaming establishment personnel or by pressing a "recommend bet" button 296 (FIG. 8). Once activated, the player's betting patterns are analyzed and a bet is recommended.

As a variation on the recommended bets, a control system such as local controller 50, table controller 40, or controller 108 may track a player's betting patterns and make macro bet recommendations to the player about betting options to simplify and accelerate the player's betting entry. If it appears that the player has a complex betting pattern, the control system may recommend a macro bet or merely define and recommend a "my normal numbers" betting option for the player.

Recommendations may also be based on inferred behavior of the player. For example, if the player makes sequential bets, such behavior may be observed and used to make recommended bets. For example, if on one spin the player bets seventeen, the next eighteen, the next nineteen, a macro bet could be defined to reflect this sequential betting series. Players being subject to superstition, players may base their sequences on location in the betting layout 66 (i.e., numerically increasing), location on the wheel 42 (i.e., rotate the bet around the wheel), or some other criteria less obvious. However, pattern detection software may be able to discern the pattern and make the recommended bet to the player.

Other criteria may also be used. For example, if a player has expressed a preference either verbally, through survey information, or the like to bet on historically "hot" numbers (e.g., a number that has been a winning number more than twice in the last fifty spins), the recommended bet may be a macro bet that accommodates this desire. Similarly, a player who bets on "cold" numbers (e.g., a number that has not been a winning number for more than fifty spin) on the theory that the number is "due" may have a cold number macro bet recommended to them. This concept can be broadened out to include column, row, even, odd, red, black, and similar bets.

Still another recommended bet may be the "copycat" macro. This macro bet evaluates the most popular bet made by other players and places the same wager. If the control system observes that the player tends to bet according to bets that other players have made, such a bet may be recommended. Conversely, if the player consistently bets against the crowd, a "non-conformist" macro bet may be made. This macro may find the one (or more) number(s) on which no player has wagered and wager for the player for that number. If every number is covered, then least popular number may be selected. Various sub-criteria may be imposed to define which is the least popular number. Note that the gaming establishment may desire to push such non-conformist macro bets so as to spread its risk. As such, such a non-conformist wager may be recommended even if the player has not exhibited a preference for such a wager.

The concept of the copycat or non-conformist macro bet may be coupled to historical information. For example, if a control system detects that one player's betting patterns result in a large number of losses, the recommendation to another player may be stated as follows, "Player X has lost on every wager she has placed, would you like to create an inverse betting option that bets the opposite way as Player X?" Thus, if Player X bets black, the macro would bet red. Likewise, if a player is experiencing a high number of winning outcomes, copycat macros may be created based on the winning player's betting selections.

As a further variation, some players may not want to be copied. Such players may be given the opportunity to indicate that their information should not be used when recommending copycat or non-conformist betting recommendations for other players.

Note that if the player-tracking database 310 stores how frequently a player's most frequent or stored bet wins or loses, recommendations may be made along these lines. For example, a message could be provided to the player stating something to the effect of, "We notice you bet on red every time. Red has only been coming up thirty percent of time in the last fifty most recent spins, would you prefer to switch to black?"

In general, a bet suggestion may include one or more of a description of the bet option that is being suggested to the player, one or more reasons to make a particular bet, one or more reasons not to make a particular bet, an indication of the odds associated with the bet (if calculable), and the like.

As a further variation on recommended bets, the croupier or other gaming establishment personnel may observe players and make suggestions that the personnel deems appropriate. For example, if on Halloween, several players arrive dressed in costume, the personnel may suggest that those players adopt a Halloween themed skin. If the players accept, the personnel may enable the skin through the croupier station 38, a mobile terminal, or instruct the players to enter the appropriate commands at the player station 36. The personnel may enter the commands to the player station 36 directly to assist the player. This last option may be omitted if it appears that such would be overly disruptive to game play, but remains possible. Such recommended bets may then be stored in the player configuration card, the player-tracking database, or other location as practical or desired. Other people, such as friends and family may also make bet recommendations based on observations.

As another variation on the customized betting options, usage of the customized betting options may be incentivized. For example, better odds may be provided, higher comp points may be provided, insurance may be made available when the player might not otherwise qualify to purchase the insurance, or the like. Such incentives may be reserved for recommended bets or provided for both player defined and recommended bets. Note as a variation on the insurance option, comp points may be provided for recommended bets. For example, if the system recommends a bet, the player makes the bet, and the player loses, an extra one hundred comp points may be awarded to the player. Note that such incentives may be contingent on a condition associated with the player's bet. Exemplary conditions include time limits (e.g., the player must place a bet within a certain time period or accept a recommendation within a certain period of time), wager limits (e.g., the player must wager above a predetermined threshold), the player must add the suggested bet option to the betting layout, the player must keep the suggested bet option on the customized betting layout for a predetermined period of time, or the like. Such incentives may also be contingent on another player's activity. If, for example, a second player places a large wager on red, then the gaming establishment may recommend that other players make wagers on black numbers coupled with an incentive so that the gaming establishment's financial exposure is minimized.

The determination of odds is also relevant to some embodiments. When the player finishes creating a bet, the odds may be determined by finding out how many numbers are covered by the bet and comparing this number to an entry in a database. For betting options covering one through six, twelve, and eighteen numbers, the odds are well established (see Table 1). However, for betting options covering other numbers, odds may be calculated through any appropriate mechanism. For example, for nine numbers, a payout of three to one maintains the traditional US house edge of 0.052632. An exemplary odds table is provided in table 5.

TABLE 5

| Potential Outcomes Selected | Odds of Winning | Payout | Expected Value | House Edge |
|---|---|---|---|---|
| 1 | 37:1 | 35:1 | .94736 | .052632 |
| 2 | 18:1 | 17:1 | .94736 | .052632 |
| 3 | 11.67:1 | 11:1 | .94736 | .052632 |
| 4 | 8.5:1 | 8:1 | .94736 | .052632 |
| 5 | 6.6:1 | 6:1 | .92105 | .078947 |
| 6 | 5.33:1 | 5:1 | .94736 | .052632 |
| 7 | 4.43:1 | 4:1 | .92105 | .078947 |
| 8 | 3.75:1 | 7:2 | .94736 | .052632 |
| 9 | 3.22:1 | 3:1 | .94736 | .052632 |
| 10 | 2.8:1 | 5:2 | .92105 | .078947 |
| 11 | 2.45:1 | 9:4 | .94079 | .059211 |
| 12 | 2.17:1 | 2:1 | .94736 | .052632 |
| 13 | 1.92:1 | 7:4 | .94079 | .059211 |
| 14 | 1.71:1 | 3:2 | .92105 | .078947 |
| 15 | 1.53:1 | 7:5 | .94737 | .052632 |
| 16 | 1.375:1 | 5:4 | .94737 | .052632 |
| 17 | 1.24:1 | 10:9 | .94444 | .055556 |
| 18 | 1:1 | 1:1 | .94736 | .052632 |

Once the odds have been determined, the odds may be presented to the player to see if she accepts the odds. When a wager is placed on a non-standard odds bet, the wager may have to be for an increased number of coins so that fractional awards are not made. However, in a virtual game, such fractional coin awards are possible. Other odds tables may also be used, especially if there is no specific need or desire to maintain a consistent house edge. Likewise, the table may be extended for more than eighteen numbers, but the odds would then be less than 1:1 and thus less attractive to many players. As an alternative to offering a fixed set of odds for the nonstandard bets, the odds for the customized bet may be made from a collection of standard bets. For example, much like the voisons bet is effectively made up of five split bets, a corner bet and a row bet, so might the customized bet be made up of discrete standard bets and the odds dictated therefrom.

Note that while it is contemplated that customization of the betting layout 66 may be made available to all roulette players, in another embodiment, players must meet some criterion before being allowed to customize the betting layout 66. The criterion which qualifies the player are myriad and may include membership in a player-tracking program (as a subset of this criterion, being a member of a certain level (e.g., red, black, silver, gold) or higher in the player-tracking program), being a hotel guest, having a theoretical win above a certain amount, having played roulette for a certain amount of time, filling out a survey, having wagered a certain value at the roulette table, having paid a premium for the privilege of customizing the betting layout 66, redeeming a certain number of comp points, purchasing the privilege as part of a package, and the like.

Rules of Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

Neither the Title (set forth at the beginning of the first page of this disclosure) nor the Abstract (set forth at the end of this disclosure) is to be taken as limiting in any way as the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "skin" is defined herein to be a graphical appearance including the text that may be changed without changing the functionality of the element to which the skin is applied. Changing the skin of something changes its look and feel, and may make usage more easy, but again, the functionality does not change. This usage comes from the common use of skins as applied to certain software programs such as instant messengers and media players.

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device or article is described herein, more than one device or article (whether or not they cooperate) may alternatively be used in place of the single device or article that is described. Accordingly, the functionality that is described as being possessed by a device may alternatively be possessed by more than one device or article (whether or not they cooperate).

Similarly, where more than one device or article is described herein (whether or not they cooperate), a single device or article may alternatively be used in place of the more than one device or article that is described. For example, a plurality of computer-based devices may be substituted with a single computer-based device. Accordingly, the various functionality that is described as being possessed by more than one device or article may alternatively be possessed by a single device or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

A "wager" is defined herein to be something on which bets are laid. If used as a verb, "to wager" is defined herein to mean to make a bet. A "bet" is defined herein to be something that is laid, staked, or pledged typically between two parties on the outcome of a contest or a contingent issue. If used as a verb, "to bet" is defined to mean to stake on the outcome of an issue. In particular for roulette, the contingent issue is into which marked cup will the ball come to rest. For a virtual wheel that does not have a real marked cup, the contingent issue may be abstracted to a random, pseudo-random number, or other mechanism corresponding to a virtual marked cup. That is, some mechanism determines an outcome from the set of potential outcomes in an essentially random manner. That mechanism, whether it be a random number generator outputting a random number and comparing that output random number to a table to determine which virtual cup should be illustrated as the cup into which the ball has come to rest or some other mechanism, the contingent event is the essentially random process through which the determination is made.

The present disclosure also uses the term "outcome". An "outcome" as that term is used herein is the resolution of the contingent event. This outcome is selected from a set of potential outcomes. The set of potential outcomes is, for the purpose of the present disclosure, the set of uniquely marked cups (virtual or real) on the roulette wheel, whether those cups are marked with numbers, names, images, or other indicia.

A player may wager on one or more potential outcomes, either singly or in combination. Each such potential wager is effectively a bet option. For example, bet options include, but are not limited to: red, black, low, high, even, odd, straight numbers, row bets, street bets, corner bets, column bets, split bets, square bets, dozens, neighbor, final, orphelins, voisins, and tier bets. The non-standard bets set forth herein also constitute bet options.

As noted above, in table roulette, players wager coins with varying denomination. Each coin is a "unit of wager". In virtual roulette, the concept of a unit of wager is a bit more flexible. A player wagers at least a single "unit of wager" to pay for a game start. In many gaming devices, a unit of wager may be referred to as a credit or a coin. In many instances, the paytable may be expressed as a number of coins won relative to a number of coins wagered. In such instances, the term coin is the same as a unit of wager. As noted above, the coin may have different denominations and units of wager may not be identically valued between different players or players on different machines. Accordingly, it should be understood that in embodiments in which a player may cash out credits from a first gaming device that operates based on a first denomination and establish using only the cashed out credits, a credit balance on a second gaming device, the player may receive a different number of credits or coins on the second gaming device than the number of coins or credits cashed out from the first gaming device.

"Determining" something can be performed in a variety of manners and therefore the term "determining" (and like terms) includes calculating, computing, deriving, looking up (e.g., in a table, database or data structure), ascertaining, recognizing, and the like.

The present disclosure frequently refers to the concept of a "controller". A controller, as that term is used herein, may be a computer processor coupled with an operating system, device drivers, and appropriate programs (collectively "software") with instructions to provide the functionality described for the controller. The software is stored in an associated memory device (sometimes referred to as a computer readable medium). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, CPU devices, computing devices, microcontrollers, digital signal processors, or like devices. Exemplary processors are the INTEL PENTIUM or AMD ATHLON processors.

The term "computer-readable medium" refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols or the like.

It will be readily apparent that the various methods and algorithms described herein may be implemented by a controller and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, SAP, ATP, or via any appropriate communications means or combination of communications means or protocols such as Bluetooth™ TDMA, CDMA, GSM, EDGE, GPRS, WCDMA, AMPS, D-AMPS, IEEE 802.11 (WI-FI), IEEE 802.3, SAP, SAS™ by IGT, OASIS™ by Aristocrat Technologies, SDS by Bally Gaming and Systems, ATP, TCP/IP, gaming device standard (GDS) published by the Gaming Standards Association of Fremont CA, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Devices in communication with each other need not be continually transmitting to each other. On the contrary, such computers and devices need only transmit to each other as necessary, and may actually refrain from exchanging data most of the time.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The present disclosure provides, to one of ordinary skill in the art, an enabling description of several embodiments and/or inventions. Some of these embodiments and/or inventions may not be claimed in the present disclosure, but may nevertheless be claimed in one or more continuing applications that claim the benefit of priority of the present disclosure.

What is claimed is:

1. A gaming machine comprising:

a housing;

a display device supported by the housing;

at least one player input device supported by the housing and configured to receive from a player: a player wager input, a player change betting layout input, and a player cash out input to cause an initiation of a payout associated with a player credit balance to the player;

a processor; and a memory device that stores a plurality of instructions that, when executed by the processor, cause the processor to:

cause, via the display device, a display of the player credit balance;

cause, via the display device, a display of a first betting layout represented by stored first data in the memory device, the first betting layout comprising a first bet option that is player selectable via the at least one player input device for a first wagering opportunity, the first bet option related to a wager made by a first other player;

based on data associated with the player change betting layout input, identify a player requested change from the first betting layout to a second betting layout, the second betting layout represented by stored second data in the memory device, the second betting layout determined using stored additional data representing an actual prior bet made by the first other player, the second betting layout comprising a second bet option that is player selectable via the at least one player input device for a second wagering opportunity, the second bet option related to a wager made by a second other player;

cause, via the display device, a display of the second betting layout represented by the stored second data in the memory device;

receive, via the at least one player input device, an input from the player, the received input selecting the second bet option of the second betting layout for the second wagering opportunity;

cause, via the display device, a display of a video representation associated with the second wagering opportunity responsive to data associated with the video representation received by the gaming machine via a data network; and responsive to the second bet option selected by the player, via the at least one player input device, being a winning outcome based on the second wagering opportunity, increasing the player credit balance.

2. A gaming machine comprising:

a housing;

a display device supported by the housing;

at least one player input device supported by the housing and configured to receive from a player: a player wager input, a player change betting layout input, and a player cash out input to cause an initiation of a payout associated with a player credit balance to the player;
a processor; and
a memory device that stores a plurality of instructions that, when executed by the processor, cause the processor to:
cause, via the display device, a display of the player credit balance;
cause, via the display device, a display of a first betting layout represented by stored first data in the memory device, the first betting layout comprising a first bet option that is player selectable via the at least one player input device for a first wagering opportunity, the first bet option related to a wager made by a first other player;
based on data associated with the player change betting layout input, identify a player requested change from the first betting layout to a second betting layout, the second betting layout represented by stored second data in the memory device, the second betting layout comprising a second bet option that is player selectable via the at least one player input device for a second wagering opportunity, the second bet option related to a wager made by a second other player, the second betting layout determined using stored additional data representing an actual prior bet made by the second other player;
cause, via the display device, a display of the second betting layout represented by the stored second data in the memory device;
receive, via the at least one player input device, an input from the player, the received input selecting the second bet option of the second betting layout for the second wagering opportunity;
cause, via the display device, a display of a video representation associated with the second wagering opportunity responsive to data associated with the video representation received by the gaming machine via a data network; and
responsive to the second bet option selected by the player, via the at least one player input device, being a winning outcome based on the second wagering opportunity, increasing the player credit balance.

3. A gaming machine comprising:
a housing;
a display device supported by the housing;
at least one player input device supported by the housing and configured to receive from a player: a player wager input, a player change betting layout input, and a player cash out input to cause an initiation of a payout associated with a player credit balance to the player;
a processor; and
a memory device that stores a plurality of instructions that, when executed by the processor, cause the processor to:
cause, via the display device, a display of the player credit balance;
cause, via the display device, a display of a first betting layout represented by stored first data in the memory device, the first betting layout comprising a first bet option that is player selectable via the at least one player input device for a first wagering opportunity, the first bet option related to a wager made by a first other player;
based on data associated with the player change betting layout input, identify a player requested change from the first betting layout to a second betting layout, the second betting layout represented by stored second data in the memory device, the second betting layout comprising a second bet option that is player selectable via the at least one player input device for a second wagering opportunity, the second bet option related to a wager made by a second other player, the second betting layout determined using stored additional data representing odds of winning the second bet option;
cause, via the display device, a display of the second betting layout represented by the stored second data in the memory device;
receive, via the at least one player input device, an input from the player, the received input selecting the second bet option of the second betting layout for the second wagering opportunity;
cause, via the display device, a display of a video representation associated with the second wagering opportunity responsive to data associated with the video representation received by the gaming machine via a data network; and
responsive to the second bet option selected by the player, via the at least one player input device, being a winning outcome based on the second wagering opportunity, increasing the player credit balance.

4. A gaming machine comprising:
a housing;
a display device supported by the housing;
at least one player input device supported by the housing and configured to receive from a player: a player wager input, a player change betting layout input, and a player cash out input to cause an initiation of a payout associated with a player credit balance to the player;
a processor; and
a memory device that stores a plurality of instructions that, when executed by the processor, cause the processor to:
cause, via the display device, a display of the player credit balance;
cause, via the display device, a display of a first betting layout represented by stored first data in the memory device, the first betting layout comprising a first bet option that is player selectable via the at least one player input device for a first wagering opportunity, the first bet option related to a wager made by a first other player;
based on data associated with the player change betting layout input, identify a player requested change from the first betting layout to a second betting layout, the second betting layout represented by stored second data in the memory device, the second betting layout comprising a second bet option that is player selectable via the at least one player input device for a second wagering opportunity, the second bet option related to a wager made by a second other player, the second betting layout determined using stored additional data representing a payout for the second bet option;
cause, via the display device, a display of the second betting layout represented by the stored second data in the memory device;
receive, via the at least one player input device, an input from the player, the received input selecting the second bet option of the second betting layout for the second wagering opportunity;
cause, via the display device, a display of a video representation associated with the second wagering opportunity responsive to data associated with the video representation received by the gaming machine via a data network; and responsive to the second bet option selected by the player, via the at least one player input device, being a winning outcome based on the second wagering opportunity, increasing the player credit balance.

5. A gaming machine comprising:

a housing;

a display device supported by the housing;

at least one player input device supported by the housing and configured to receive from a player: a player wager input, a player change betting layout input, and a player cash out input to cause an initiation of a payout associated with a player credit balance to the player;

a processor; and a memory device that stores a plurality of instructions that, when executed by the processor, cause the processor to:

cause, via the display device, a display of the player credit balance;

cause, via the display device, a display of a first betting layout represented by stored first data in the memory device, the first betting layout comprising a first bet option that is player selectable via the at least one player input device for a first wagering opportunity, the first bet option related to a wager made by a first other player;

based on data associated with the player change betting layout input, identify a player requested change from the first betting layout to a second betting layout, the second betting layout represented by stored second data in the memory device, the second betting layout comprising a second bet option that is player selectable via the at least one player input device for a second wagering opportunity, the second bet option related to a wager made by a second other player, the second betting layout determined using stored additional data representing a preference previously inputted by the player;

cause, via the display device, a display of the second betting layout represented by the stored second data in the memory device;

receive, via the at least one player input device, an input from the player, the received input selecting the second bet option of the second betting layout for the second wagering opportunity;

cause, via the display device, a display of a video representation associated with the second wagering opportunity responsive to data associated with the video representation received by the gaming machine via a data network; and responsive to the second bet option selected by the player, via the at least one player input device, being a winning outcome based on the second wagering opportunity, increasing the player credit balance.

6. A gaming machine comprising:

a housing;

a display device supported by the housing;

at least one player input device supported by the housing and configured to receive from a player: a player wager input, a player change betting layout input, and a player cash out input to cause an initiation of a payout associated with a player credit balance to the player;

a processor; and a memory device that stores a plurality of instructions that, when executed by the processor, cause the processor to:

cause, via the display device, a display of the player credit balance;

cause, via the display device, a display of a first betting layout represented by stored first data in the memory device, the first betting layout comprising a first bet option that is player selectable via the at least one player input device for a first wagering opportunity, the first bet option related to a wager made by a first other player;

based on data associated with the player change betting layout input, identify a player requested change from the first betting layout to a second betting layout, the second betting layout represented by stored second data in the memory device, the second betting layout comprising a second bet option that is player selectable via the at least one player input device for a second wagering opportunity, the second bet option related to a wager made by a second other player, the second betting layout determined using stored additional data representing an incentive available for the second bet option;

cause, via the display device, a display of the second betting layout represented by the stored second data in the memory device;

receive, via the at least one player input device, an input from the player, the received input selecting the second bet option of the second betting layout for the second wagering opportunity;

cause, via the display device, a display of a video representation associated with the second wagering opportunity responsive to data associated with the video representation received by the gaming machine via a data network; and responsive to the second bet option selected by the player, via the at least one player input device, being a winning outcome based on the second wagering opportunity, increasing the player credit balance.

* * * * *